(12) United States Patent
Wang

(10) Patent No.: US 10,949,660 B2
(45) Date of Patent: Mar. 16, 2021

(54) ELECTRONIC HANDWRITING PROCESSOR WITH CONVOLUTIONAL NEURAL NETWORKS

(71) Applicant: Pearson Education, Inc., New York, NY (US)

(72) Inventor: Zhaodong Wang, Menlo Park, CA (US)

(73) Assignee: PEARSON EDUCATION, INC., New York, NY (US)

(*) Notice: Subject to any disclaimer, the term of this patent is extended or adjusted under 35 U.S.C. 154(b) by 14 days.

(21) Appl. No.: 15/905,690

(22) Filed: Feb. 26, 2018

(65) Prior Publication Data
US 2018/0293435 A1    Oct. 11, 2018

Related U.S. Application Data

(60) Provisional application No. 62/483,855, filed on Apr. 10, 2017.

(51) Int. Cl.
*G06K 9/00* (2006.01)
*G06K 9/42* (2006.01)
(Continued)

(52) U.S. Cl.
CPC ..... *G06K 9/00416* (2013.01); *G06K 9/00409* (2013.01); *G06K 9/00429* (2013.01); *G06K 9/42* (2013.01); *G06K 9/6256* (2013.01); *G06K 9/72* (2013.01); *G06N 3/0454* (2013.01); *G06N 3/08* (2013.01); *G06N 20/00* (2019.01); *G09B 5/02* (2013.01); *G09B 7/04* (2013.01); *G09B 11/00* (2013.01); *G06K 9/4628* (2013.01);
(Continued)

(58) Field of Classification Search
CPC .......... G06K 9/00416; G06K 2209/01; G06K 9/00409; G06K 9/00429; G06K 9/72; G06K 9/6256; G06K 9/42; G06K 9/4628; G06K 9/723; G06N 3/0454; G06N 20/00; G06N 3/08; G09B 7/04; G09B 11/00; G09B 5/02; G09B 5/12
See application file for complete search history.

(56) References Cited

U.S. PATENT DOCUMENTS 5,034,991 A    7/1991    Hagimae et al.
5,596,698 A    1/1997    Morgan
(Continued)

OTHER PUBLICATIONS

K. Ntirogiannis, et al., "A combined approach for the binarization of handwritten document images," Pattern Recognition Letters, vol. 35. No. 1, pp. 3-15. 2014.
(Continued)

*Primary Examiner* — John W Lee
(74) *Attorney, Agent, or Firm* — Quarles & Brady LLP

(57) ABSTRACT

An improved machine learning system is provided. For example, a content management server may provide real-time analysis of a user's handwriting to assess the user's knowledge of a language, including using a convolution neural network method. The convolution neural network method may be executed to normalize at least some identified strokes in the user's handwritten user input. Normalization may be performed by translating a window comprising a subset of pixels in a digital representation of the handwritten user input amongst a plurality of pixels in the digital representation.

15 Claims, 19 Drawing Sheets

(51) Int. Cl.

| | | |
|---|---|---|
| *G06K 9/62* | (2006.01) | |
| *G06K 9/72* | (2006.01) | |
| *G06N 20/00* | (2019.01) | |
| *G06N 3/04* | (2006.01) | |
| *G09B 5/02* | (2006.01) | |
| *G09B 11/00* | (2006.01) | |
| *G06N 3/08* | (2006.01) | |
| *G09B 7/04* | (2006.01) | |
| *G06K 9/46* | (2006.01) | |
| *G09B 5/12* | (2006.01) | |

(52) U.S. Cl.
CPC ......... *G06K 9/723* (2013.01); *G06K 2209/01* (2013.01); *G09B 5/12* (2013.01)

(56) References Cited

U.S. PATENT DOCUMENTS

| | | | |
|---|---|---|---|
| 5,672,060 | A | 9/1997 | Poor |
| 5,842,871 | A | 12/1998 | Cutler et al. |
| 6,246,794 | B1 | 6/2001 | Kagehiro et al. |
| 6,676,412 | B1 | 1/2004 | Masterson et al. |
| 2004/0017403 | A1 | 1/2004 | Andersson et al. |
| 2004/0017944 | A1* | 1/2004 | Ding ............... G06K 9/4609 382/182 |
| 2004/0121298 | A1 | 6/2004 | Creamer et al. |
| 2004/0148577 | A1 | 7/2004 | Xu et al. |
| 2006/0039605 | A1 | 2/2006 | Koga |
| 2007/0005537 | A1* | 1/2007 | Abdulkader ......... G06K 9/6254 706/20 |
| 2007/0050411 | A1 | 3/2007 | Hull et al. |
| 2007/0133877 | A1* | 6/2007 | Wang ............... G06K 9/6835 382/187 |
| 2007/0291017 | A1 | 12/2007 | Syeda-Mahmood et al. |
| 2009/0060396 | A1 | 3/2009 | Blessan et al. |
| 2010/0067793 | A1 | 3/2010 | Serrano et al. |
| 2010/0104189 | A1* | 4/2010 | Aravamudhan ... G06K 9/00422 382/187 |
| 2011/0151423 | A1 | 6/2011 | Venable |
| 2013/0066750 | A1 | 3/2013 | Siddique et al. |
| 2013/0290106 | A1 | 10/2013 | Bradley et al. |
| 2014/0118315 | A1 | 5/2014 | Black et al. |
| 2015/0243180 | A1 | 8/2015 | Kim et al. |
| 2016/0042198 | A1 | 2/2016 | Kapoor et al. |
| 2016/0217701 | A1 | 7/2016 | Brown et al. |
| 2016/0300135 | A1 | 10/2016 | Moudy et al. |
| 2016/0358087 | A1 | 12/2016 | Frieder et al. |
| 2016/0358495 | A1 | 12/2016 | Bushell |
| 2016/0364010 | A1 | 12/2016 | Amma et al. |
| 2017/0004415 | A1 | 1/2017 | Moretti et al. |
| 2017/0005868 | A1 | 1/2017 | Scheines et al. |
| 2017/0031999 | A1 | 2/2017 | Kapoor et al. |
| 2017/0046194 | A1 | 2/2017 | Jones et al. |
| 2017/0048269 | A1 | 2/2017 | York et al. |
| 2017/0083488 | A1 | 3/2017 | Ostler et al. |
| 2017/0084186 | A1 | 3/2017 | Ostler et al. |
| 2018/0268015 | A1 | 9/2018 | Sugaberry |

OTHER PUBLICATIONS

Alex Graves, et al., "A novel connectionist system for unconstrained handwriting recognition," IEEE Transactions on Pattern Analysis and Machine intelligence, vol. 3 I , No. 5, pp. 855-868, 2009.

Yujia Li, et al., "Feedback based Handwriting Recognition From Inertial Sensor Data for Wearable Devices," in ICASSP, 2015.

Jue Wang et al., "RF-IDraw: Virtual Touch Screen in the Air Using RF Signals," Sigcomm 2014, pp. 235-246, 2014.

P Hidalgo et al, "New Technologies to Assess English Learners," in the California Education Research Association (CERA.) Conference, 2014.

Lisa Anthony et al., "Interaction and recognition challenges in interpreting children's touch and gesture input on mobile devices," Proceeding s of the 2012 ACM international conference on Interactive tabletops and surfaces—ITS '12, p. 225, 2012.

Jianying Hu, et al., "Writer Independent On-line Handwriting Recognition using an HMM Approach," Pattern Recognition, pp. 133-147, 2000.

Esra Vural, et al., "An online handwriting recognition system for Turkish," Proceedings of the IEEE 12th Signal Processing and Communications Applications Conference.. pp. 607-610, 2004.

Alex Graves, et al., "Offline Handwriting Recognition with Multidimensional Recurrent Neural Networks," Advances in Neural Information Processing Systems 21, NIPS'21, pp. 545-552, 2008.

Theodore Bluche, "Framewise and CTC Training of Neural Networks for Handwriting Recognition," in JCDAR, 2015.

S. Jaeger, et al., "Online handwriting recognition: the NPen++ recognizer." International Journal on Document Analysis and Recognition, vol. 3. No. 3. pp. 169-180, 2001.

Theodore Bluche, et al., "Tandem HMM with Convolutional Neural Network for Handwritten Word Recognition," Pattern Recognition, pp. 2390-2394, 2013.

Yann LeCun, et al., "Gradient-based Learning Applied to Document Recognition." Proceedings of the IEEE, pp. 2278-2324, 1998.

Aiguan Yuan., et al "Handwritten English Word Recognition Based on Convolutional Neural Networks," international Conference on Frontiers in Handwriting Recognition, pp. 207-212, 2012.

Yan Gao, et al., "Chinese hand-writing quality evaluation based on analysis of recognition confidence." 2011 IEEE International Conference on Information and Automation, pp. 221-225, 2011.

Kai-Tai Tang, et al., "A Web- Based Chinese Handwriting Education System with Automatic Feedback and Analysis," Advances in Web Based Learning ICWL 2006. vol. 4181, pp. 176-188, 2006.

E. Wai-Chung-Leung, et al., "A Model for Personalized Course Material Generation Based on Student Learning Abilities and Interests" International Conference on Web-Based Learning, ICWL 2006.

Hala Bezine, et al., "Development of an Arabic Handwriting Learning Educational System," International Journal of Software Engineering and Applications (IJSEA), vol. 4, No. 2, pp. 33-49, 2013.

Victor Kulesh, et al ., "Handwriting Quality Evaluation," Advances in Pattern Recognition, JCAPR, 2001.

Danfeng Li et al., "HMM topology optimization for handwriting recognition," in JCASSP, 2001, pp. 1521-1524.

Tia Deng, et al., "ImageNet: A large-scale hierarchical image database," IEEE Conference on Computer Vision and Pattern Recognition, pp. 2-9, 2009.

Alex Krizhevsky, et al., "ImageNet Classification with Deep Convolutional Neural Networks," Advances in Neural information Processing systems, pp. 1-9, 2012.

\* cited by examiner

ELECTRONIC HANDWRITING PROCESSOR WITH CONVOLUTIONAL NEURAL NETWORKS

CROSS-REFERENCES TO RELATED APPLICATIONS

The present application claims the benefit of U.S. Patent Application No. 62/483,855 and is related to U.S. patent application Ser. No. 15/905,595, entitled "ELECTRONIC HANDWRITING ANALYSIS THROUGH ADAPTIVE MACHINE-LEARNING"; U.S. patent application Ser. No. 15/905,645, entitled "ELECTRONIC HANDWRITING PROCESSOR WITH DERIVATIVE COORDINATE MODELING"; each of which is assigned to the same assignee and incorporated herein by reference in its entirety for all purposes.

BACKGROUND

An assessment of language skills can be objective or subjective based on the type of assessment. For objective assessments, a set of predetermined test questions are provided to a user to determine their knowledge language. This type of assessment process may lack clarification of which portions of the language the user is underperforming. For subjective assessments, the scalability of this type of assessment is limited to the number of users that are able to provide the questions to the users answering the questions.

When attempting to implement the assessment on a machine, the users answering the questions interact differently with the machines than they would with questions provided in a face-to-face environment. The scoring of the assessment may change. Additionally, these machines are often implemented in a poorly networked environment that may affect the assessment and data-gathering with unintended consequences.

BRIEF SUMMARY

One aspect of the present disclosure relates to systems and methods for improving distribution and conversion of academic data, the content management system comprising: one or more processors; and one or more memories coupled with the one or more processors, wherein the one or more processors and the one or more memories are configured to: generate a digital representation of a handwritten user input; identify strokes in the digital representation of the handwritten user input; store the identified strokes; correct at least some of the identified strokes; normalize the at least some of the identified strokes; segment the digital representation of the handwritten user input into normalized digital strokes; determine at least one character associated with the normalized digital strokes; and generate a word hypothesis by applying a model to the at least one character.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability, or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Embodiments of the application describe various improvements to systems, methods, and devices throughout the communication network described herein. For example, the content management server may provide a digital assessment of a user's handwriting to assess the user's knowledge of a language. The assessment may comprise adaptive technology to help determine initial questions to provide to the user as well as follow-up questions to clarify appropriate remediation content in a particular context. The content management server may also provide real-time analysis, including assessing multiple users at the same time in adjusting the assessment based on the digital input from each of these users. In some examples, the content management server may incorporate handwriting analysis methods to perform object detection and score handwriting input.

Technical improvements are realized throughout the application with respect to conventional systems. For example, a typical system may assess the user's knowledge of the language by testing vocabulary words and paragraphs which may ask users to copy or write some of the words or letters. Embodiments of the application may further assess basic skills to understand the language alphabet, letters, and spelling, while incorporating interactions with a user device (e.g., timing, tapping the screen, audio input, etc.) to assess more information than what is provided on a piece of paper. The additional data may be compared with a machine learning training data set to assess an overall score associated with the particular user and improve electronic communications with the user device.

Other systems may leverage on-time sequence modeling or graph matching between handwriting from a first user and a second user. However, several other systems cannot infer objective scores or scale for real-time analysis of a plurality of user devices, especially with respect to a time constraint.

Figure 1:
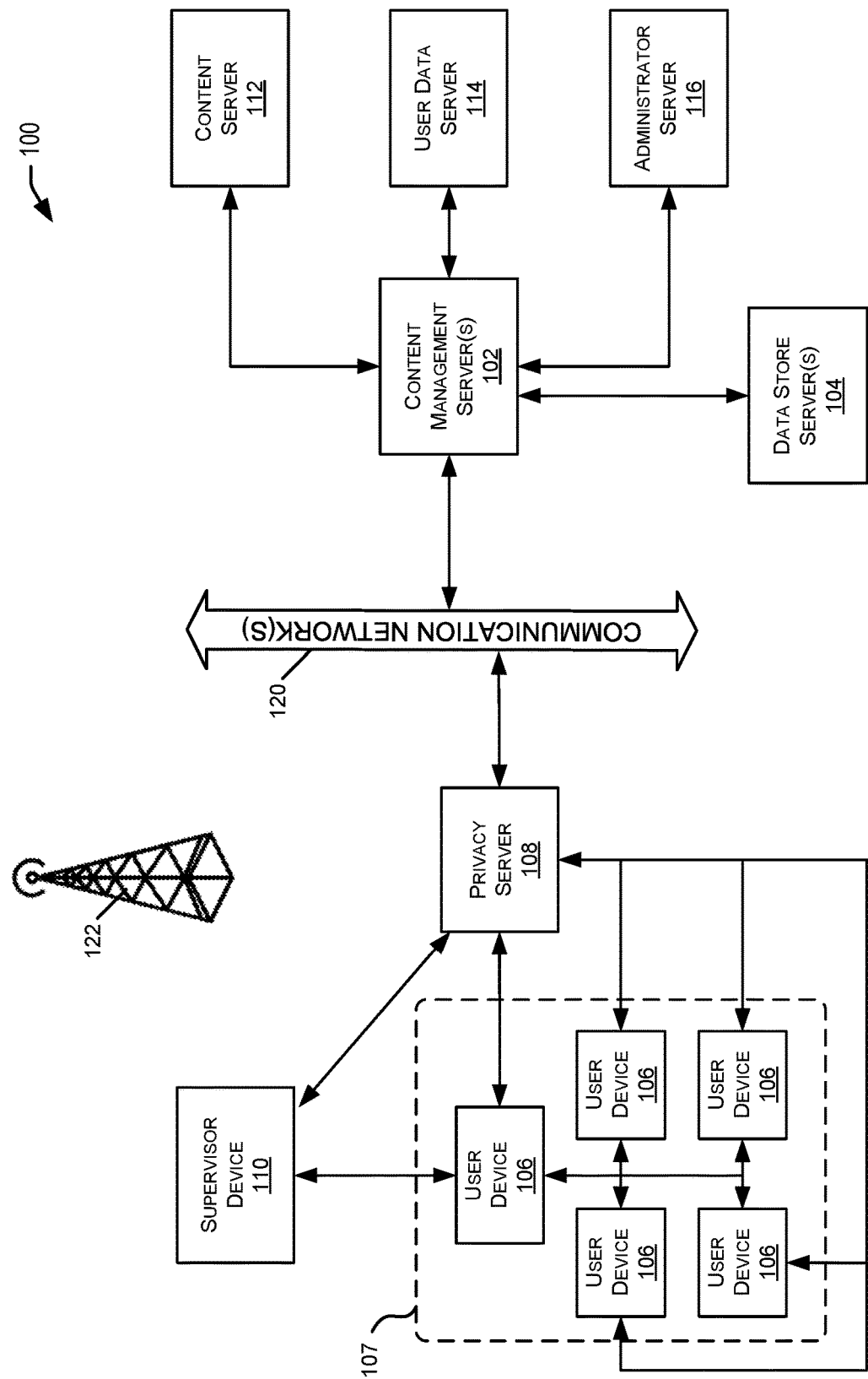
FIG. 1 is a block diagram illustrating an example of a content distribution network.

With reference now to FIG. 1, a block diagram is shown illustrating various components of a content distribution network (CDN) 100 which implements and supports certain embodiments and features described herein. In some embodiments, the content distribution network 100 can comprise one or several physical components and/or one or several virtual components such as, for example, one or several cloud computing components. In some embodiments, the content distribution network 100 can comprise a mixture of physical and cloud computing components.

Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing unit, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatively connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives (e.g., Serial AT Attachment drives) or one or several NL-SATA drives (e.g., Near Line Serial AT Attachment drives).

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or a personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 114, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

The content distribution network 100 may include one or several navigation systems or features including, for example, the Global Positioning System ("GPS"), GALILEO (e.g., Europe's global positioning system), or the like, or location systems or features including, for example, one or several transceivers that can determine location of the one or several components of the content distribution network 100 via, for example, triangulation. All of these are depicted as navigation system 122.

In some embodiments, navigation system 122 can include or several features that can communicate with one or several components of the content distribution network 100 including, for example, with one or several of the user devices 106 and/or with one or several of the supervisor devices 110. In some embodiments, this communication can include the transmission of a signal from the navigation system 122 which signal is received by one or several components of the content distribution network 100 and can be used to determine the location of the one or several components of the content distribution network 100.

Figure 2:
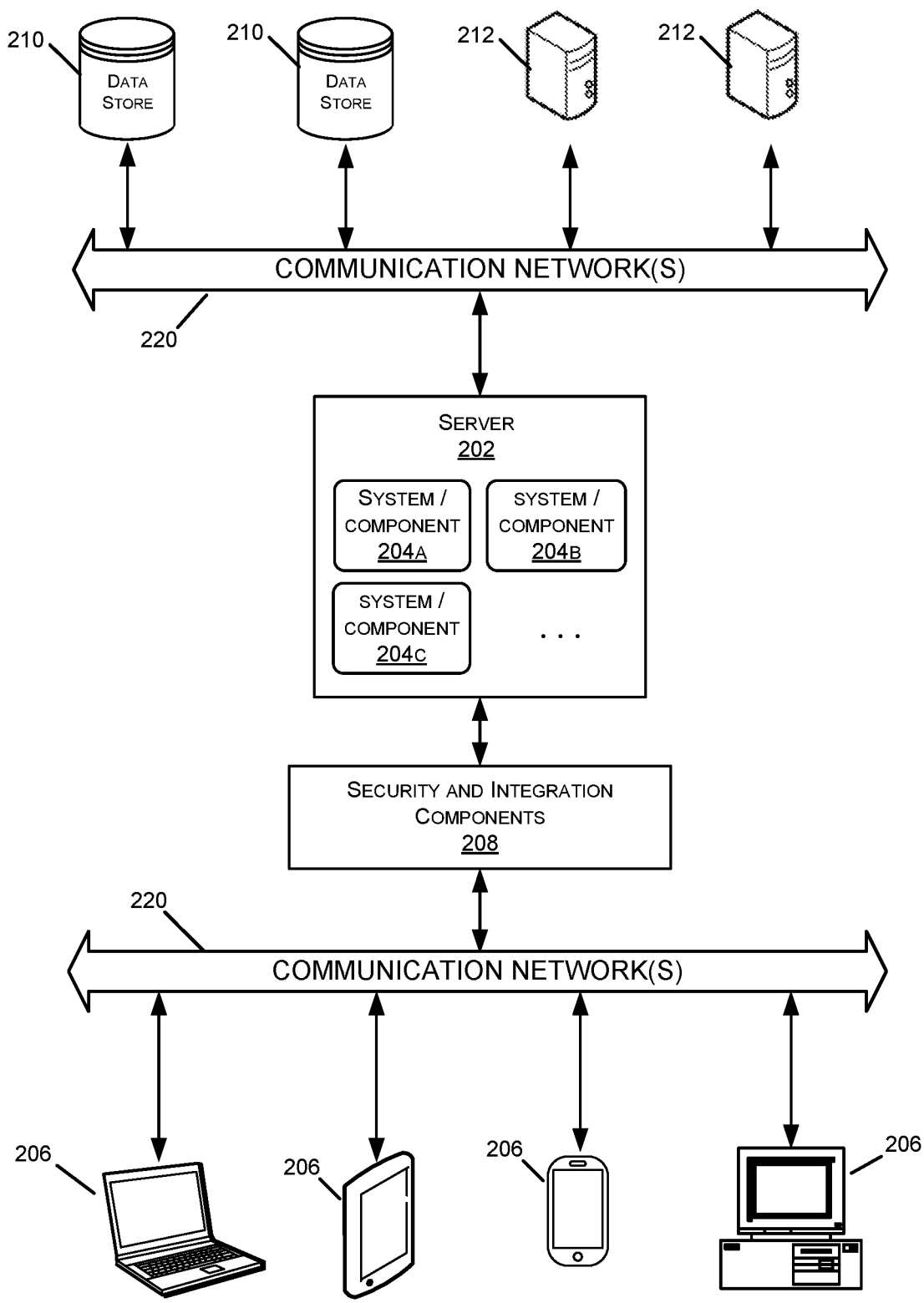
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of the same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP (e.g., Simple Object Access Protocol) messages using Extensible Markup Language (XML) encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring, and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
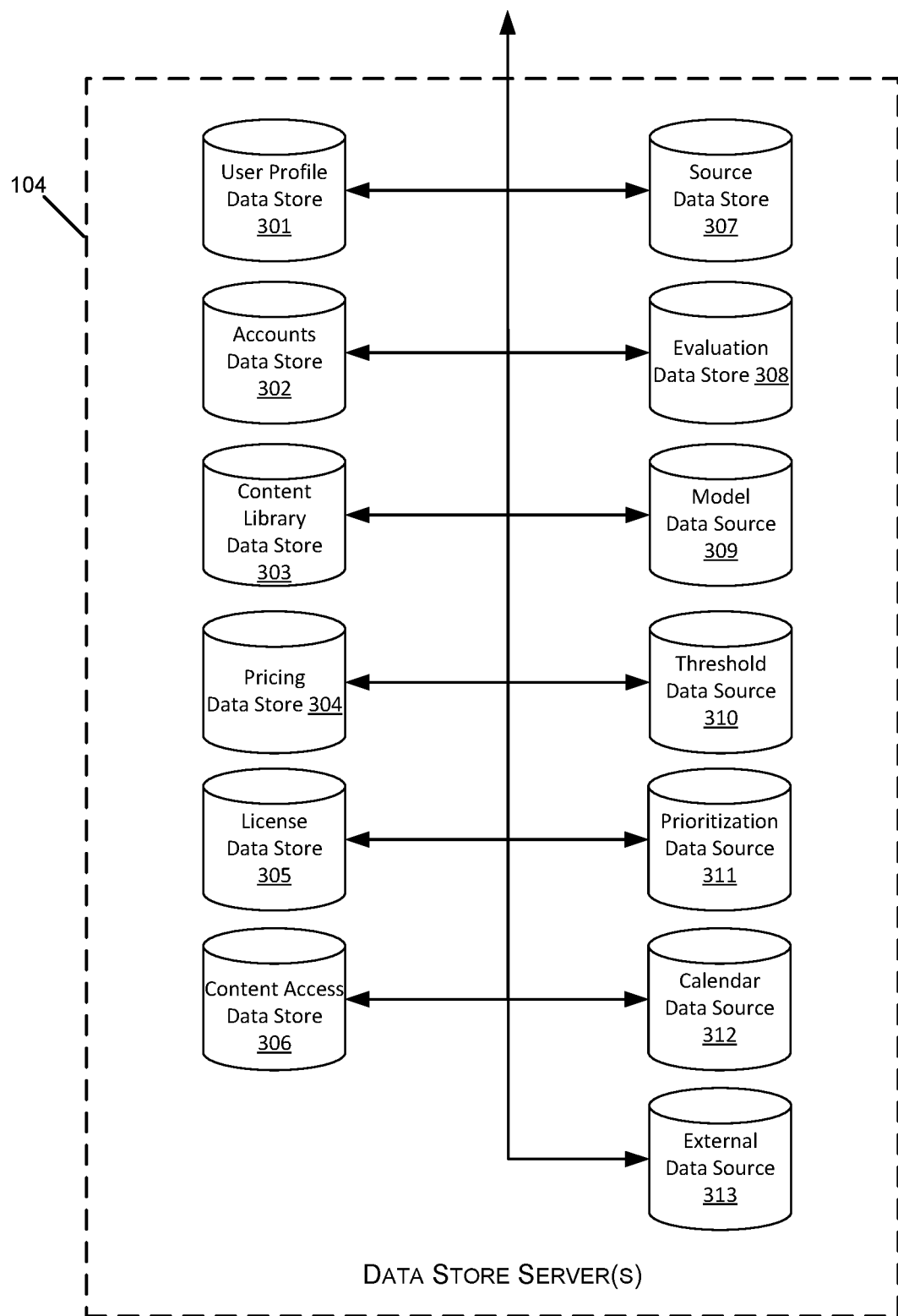
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-313 may reside in storage on a single computer server 104 (or a single server farm or cluster) under the control of a single entity, may be virtually implemented, or may reside on separate servers operated by different entities and/or at remote locations. In some embodiments, data stores 301-313 may be accessed by the content management server 102 and/or other devices and servers within the network 100 (e.g., user devices 106, supervisor devices 110, administrator servers 116, etc.). Access to one or more of the data stores 301-313 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-313, including their functionality and types of data stored therein, are illustrative and non-limiting. Data stores server architecture, design, and the execution of specific data stores 301-313 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

The user profile database 301 can include information relating to a user's status, location, or the like. This information can identify, for example, a device a user is using, the location of that device, or the like. In some embodiments, this information can be generated based on any location detection technology including, for example, a navigation system 122, or the like.

Information relating to the user's status can identify, for example, logged-in status information that can indicate whether the user is presently logged-in to the content distribution network 100 and/or whether the log-in is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100. In some embodiments, this can comprise response information such as, for example, information identifying one or several questions or pieces of content and responses provided to the same. In some embodiments, this response information can be formed into one or several matrices "D" containing information for n users responding top items, these one or several matrices D are also referred to herein as the matrix D, the D matrix, the user matrix, and/or the response matrix. Thus, the matrix D can have n×p dimensions, and in some embodiments, the matrix D can identify whether user responses to items were correct or incorrect. In some embodiments, for example, the matrix D can include an entry "1" for an item when a user response to that item is correct and can otherwise include and entry "0".

The user profile database 301 can include information relating to one or several student learning preferences. In some embodiments, for example, the user, also referred to herein as the student or the student-user, may have one or several preferred learning styles, one or several most effective learning styles, and/or the like. In some embodiments, the user's learning style can be any learning style describing how the user best learns or how the user prefers to learn. In one embodiment, these learning styles can include, for example, identification of the user as an auditory learner, as a visual learner, and/or as a tactile learner. In some embodiments, the data identifying one or several user learning styles can include data identifying a learning style based on the user's educational history such as, for example, identifying a user as an auditory learner when the user has received significantly higher grades and/or scores on assignments and/or in courses favorable to auditory learners. In some embodiments, this information can be stored in a tier of memory that is not the fastest memory in the content delivery network 100.

In some embodiments, the user profile data store 301 can further include information identifying one or several user skill levels. In some embodiments, these one or several user skill levels can identify a skill level determined based on past performance by the user interacting with the content delivery network 100, and in some embodiments, these one or several user skill levels can identify a predicted skill level determined based on past performance by the user interacting with the content delivery network 100 and one or several predictive models.

The user profile database 301 can further include information relating to one or several teachers and/or instructors who are responsible for organizing, presenting, and/or managing the presentation of information to the user. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual content items (or content resources or data packets) available via the content distribution network 100. In some embodiments, these data packets in the content library database 303 can be linked to from an object network, or specifically to form a Bayes Net content network or learning graph. In some embodiments, these data packets can be linked in the object network according to one or several prerequisite relationships that can, for example, identify the relative hierarchy and/or difficulty of the data objects. In some embodiments, this hierarchy of data objects can be generated by the content distribution network 100 according to user experience with the object network, and in some embodiments, this hierarchy of data objects can be generated based on one or several existing and/or external hierarchies such as, for example, a syllabus, a table of contents, or the like. In some embodiments, for example, the object network can correspond to a syllabus such that content for the syllabus is embodied in the object network.

In some embodiments, the content library data store 303 can comprise a syllabus, a schedule, or the like. In some embodiments, the syllabus or schedule can identify one or several tasks and/or events relevant to the user. In some embodiments, for example, when the user is a member of a group such as, a section or a class, these tasks and/or events relevant to the user can identify one or several assignments, quizzes, exams, or the like.

In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

In some embodiments, the content library data store 303 can contain information used in evaluating responses received from users. In some embodiments, for example, a user can receive content from the content distribution network 100 and can, subsequent to receiving that content, provide a response to the received content. In some embodiments, for example, the received content can comprise one or several questions, prompts, or the like, and the response to the received content can comprise an answer to those one or several questions, prompts, or the like. In some embodiments, information, referred to herein as "comparative data," from the content library data store 303 can be used to determine whether the responses are the correct and/or desired responses.

In some embodiments, the content library database 303 and/or the user profile database 301 can comprise an aggregation network also referred to herein as a content network or content aggregation network. The aggregation network can comprise a plurality of content aggregations that can be linked together by, for example: creation by common user; relation to a common subject, topic, skill, or the like; creation from a common set of source material such as source data packets; or the like. In some embodiments, the content aggregation can comprise a grouping of content comprising the presentation portion that can be provided to the user in the form of, for example, a flash card and an extraction portion that can comprise the desired response to the presentation portion such as for example, an answer to a flash card. In some embodiments, one or several content aggregations can be generated by the content distribution network 100 and can be related to one or several data packets they can be, for example, organized in object network. In some embodiments, the one or several content aggregations can be each created from content stored in one or several of the data packets.

In some embodiments, the content aggregations located in the content library database 303 and/or the user profile database 301 can be associated with a user-creator of those content aggregations. In some embodiments, access to content aggregations can vary based on, for example, whether a user created the content aggregations. In some embodiments, the content library database 303 and/or the user profile database 301 can comprise a database of content aggregations associated with a specific user, and in some embodiments, the content library database 303 and/or the user profile database 301 can comprise a plurality of databases of content aggregations that are each associated with a specific user. In some embodiments, these databases of content aggregations can include content aggregations created by their specific user and in some embodiments, these databases of content aggregations can further include content aggregations selected for inclusion by their specific user and/or a supervisor of that specific user. In some embodiments, these content aggregations can be arranged and/or linked in a hierarchical relationship similar to the data packets in the object network and/or linked to the object network in the object network or the tasks or skills associated with the data packets in the object network or the syllabus or schedule.

In some embodiments, the content aggregation network, and the content aggregations forming the content aggregation network, can be organized according to the object network and/or the hierarchical relationships embodied in the object network. In some embodiments, the content aggregation network, and/or the content aggregations forming the content aggregation network, can be organized according to one or several tasks identified in the syllabus, schedule or the like.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee or pricing based on network usage. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

A model data store 309, also referred to herein as a model database 309 can store information relating to one or several predictive models. In some embodiments, these can include one or several evidence models, risk models, skill models, or the like. In some embodiments, an evidence model can be a mathematically-based statistical model. The evidence model can be based on, for example, Item Response Theory (IRT), Bayesian Network (Bayes net), Performance Factor Analysis (PFA), or the like. The evidence model can, in some embodiments, be customizable to a user and/or to one or several content items. Specifically, one or several inputs relating to the user and/or to one or several content items can be inserted into the evidence model. These inputs can include, for example, one or several measures of user skill level, one or several measures of content item difficulty and/or skill level, or the like. The customized evidence model can then be used to predict the likelihood of the user providing desired or undesired responses to one or several of the content items.

In some embodiments, the risk models can include one or several models that can be used to calculate one or several model function values. In some embodiments, these one or several model function values can be used to calculate a risk probability, which risk probability can characterize the risk of a student-user failing to achieve a desired outcome such as, for example, failing to correctly respond to one or several data packets, failure to achieve a desired level of completion of a program, for example in a pre-defined time period, failure to achieve a desired learning outcome, or the like. In some embodiments, the risk probability can identify the risk of the student-user failing to complete 60% of the program.

In some embodiments, these models can include a plurality of model functions including, for example, a first model function, a second model function, a third model function, and a fourth model function. In some embodiments, some or all of the model functions can be associated with a portion of the program such as, for example a completion stage and/or completion status of the program. In one embodiment, for example, the first model function can be associated with a first completion status, the second model function can be associated with a second completion status, the third model function can be associated with a third completion status, and the fourth model function can be associated with a fourth completion status. In some embodiments, these completion statuses can be selected such that some or all of these completion statuses are less than the desired level of completion of the program. Specifically, in some embodiments, these completion statuses can be selected to all be at less than 60% completion of the program, and more specifically, in some embodiments, the first completion status can be at 20% completion of the program, the second completion status can be at 30% completion of the program, the third completion status can be at 40% completion of the program, and the fourth completion status can be at 50% completion of the program. Similarly, any desired number of model functions can be associated with any desired number of completion statuses.

In some embodiments, a model function can be selected from the plurality of model functions based on a user's progress through a program. In some embodiments, the user's progress can be compared to one or several status trigger thresholds, each of which status trigger thresholds can be associated with one or more of the model functions. If one of the status triggers is triggered by the user's progress, the corresponding one or several model functions can be selected.

The model functions can comprise a variety of types of models and/or functions. In some embodiments, each of the model functions outputs a function value that can be used in calculating a risk probability. This function value can be calculated by performing one or several mathematical operations on one or several values indicative of one or several user attributes and/or user parameters, also referred to herein as program status parameters. In some embodiments, each of the model functions can use the same program status parameters, and in some embodiments, the model functions can use different program status parameters. In some embodiments, the model functions use different program status parameters when at least one of the model functions uses at least one program status parameter that is not used by others of the model functions.

In some embodiments, a skill model can comprise a statistical model identifying a predictive skill level of one or several users. In some embodiments, this model can identify a single skill level of a user and/or a range of possible skill levels of a user. In some embodiments, this statistical model can identify a skill level of a student-user and an error value or error range associated with that skill level. In some embodiments, the error value can be associated with a confidence interval determined based on a confidence level. Thus, in some embodiments, as the number of user interactions with the content distribution network increases, the confidence level can increase and the error value can decrease such that the range identified by the error value about the predicted skill level is smaller.

A threshold database 310 can store one or several threshold values. These one or several threshold values can delineate between states or conditions. In one exemplary embodiment, for example, a threshold value can delineate between an acceptable user performance and an unacceptable user performance, between content appropriate for a user and content that is inappropriate for a user, between risk levels, or the like.

A prioritization database 311 can include data relating to one or several tasks and the prioritization of those one or several tasks with respect to each other. In some embodiments, the prioritization database 311 can be unique to a specific user, and in some embodiments, the prioritization database 311 can be applicable to a plurality of users. In some embodiments in which the prioritization database 311 is unique to a specific user, the prioritization database 311 can be a sub-database of the user profile database 301. In some embodiments, the prioritization database 311 can include information identifying a plurality of tasks and a relative prioritization amongst that plurality of tasks. In some embodiments, this prioritization can be static and in some embodiments, this prioritization can be dynamic in that the prioritization can change based on updates, for example, one or several of the tasks, the user profile database 301, or the like. In some embodiments, the prioritization database 311 can include information relating to tasks associated with a single course, group, class, or the like, and in some embodiments, the prioritization database 311 can include information relating to tasks associated with a plurality of courses, groups, classes, or the like.

A task can define an objective and/or outcome and can be associated with one or several data packets that can, for example, contribute to user attainment of the objective and/or outcome. In some embodiments, some or all of the data packets contained in the content library database 303 can be linked with one or several tasks stored in the prioritization database 311 such that a single task can be linked and/or associated with one or several data packets.

The prioritization database 311 can further include information relevant to the prioritization of one or several tasks and/or the prioritization database 311 can include information that can be used in determining the prioritization of one or several tasks. In some embodiments, this can include weight data which can identify a relative and/or absolute weight of a task. In some embodiments, for example, the weight data can identify the degree to which a task contributes to an outcome such as, for example, a score or a grade. In some embodiments, this weight data can specify the portion and/or percent of a grade of a class, section, course, or study that results from, and/or that is associated with the task.

The prioritization database 311 can further include information relevant to the composition of the task. In some embodiments, for example, this information, also referred to herein as a composition value, can identify one or several sub-tasks and/or content categories forming the tasks, as well as a contribution of each of those sub-tasks and/or content categories to the task. In some embodiments, the application of the weight data to the composition value can result in the identification of a contribution value for the task and/or for the one or several sub-tasks and/or content categories forming the task. This contribution value can identify the contribution of one, some, or all of the sub-tasks and/or content categories to the outcome such as, for example, the score or the grade.

The calendar data source 312, also referred to herein as the calendar database 312 can include timing information relevant to the tasks contained in the prioritization database 311. In some embodiments, this timing information can identify one or several dates by which the tasks should be completed, one or several event dates associated with the task such as, for example, one or several due dates, test dates, or the like, holiday information, or the like. In some embodiments, the calendar database 312 can further include any information provided to the user relating to other goals, commitments, or the like.

In addition to the illustrative data stores described above, data store server(s) 104 (e.g., database servers, file-based storage servers, etc.) may include one or more external data aggregators 313. External data aggregators 313 may include third-party data sources accessible to the content management network 100, but not maintained by the content management network 100. External data aggregators 313 may include any electronic information source relating to the users, content resources, or applications of the content distribution network 100. For example, external data aggregators 313 may be third-party data stores containing demographic data, education related data, consumer sales data, health related data, and the like. Illustrative external data aggregators 313 may include, for example, social networking web servers, public records data stores, learning management systems, educational institution servers, business servers, consumer sales data stores, medical record data stores, etc. Data retrieved from various external data aggregators 313 may be used to verify and update user account information, suggest user content, and perform user and content evaluations.

Figure 4:
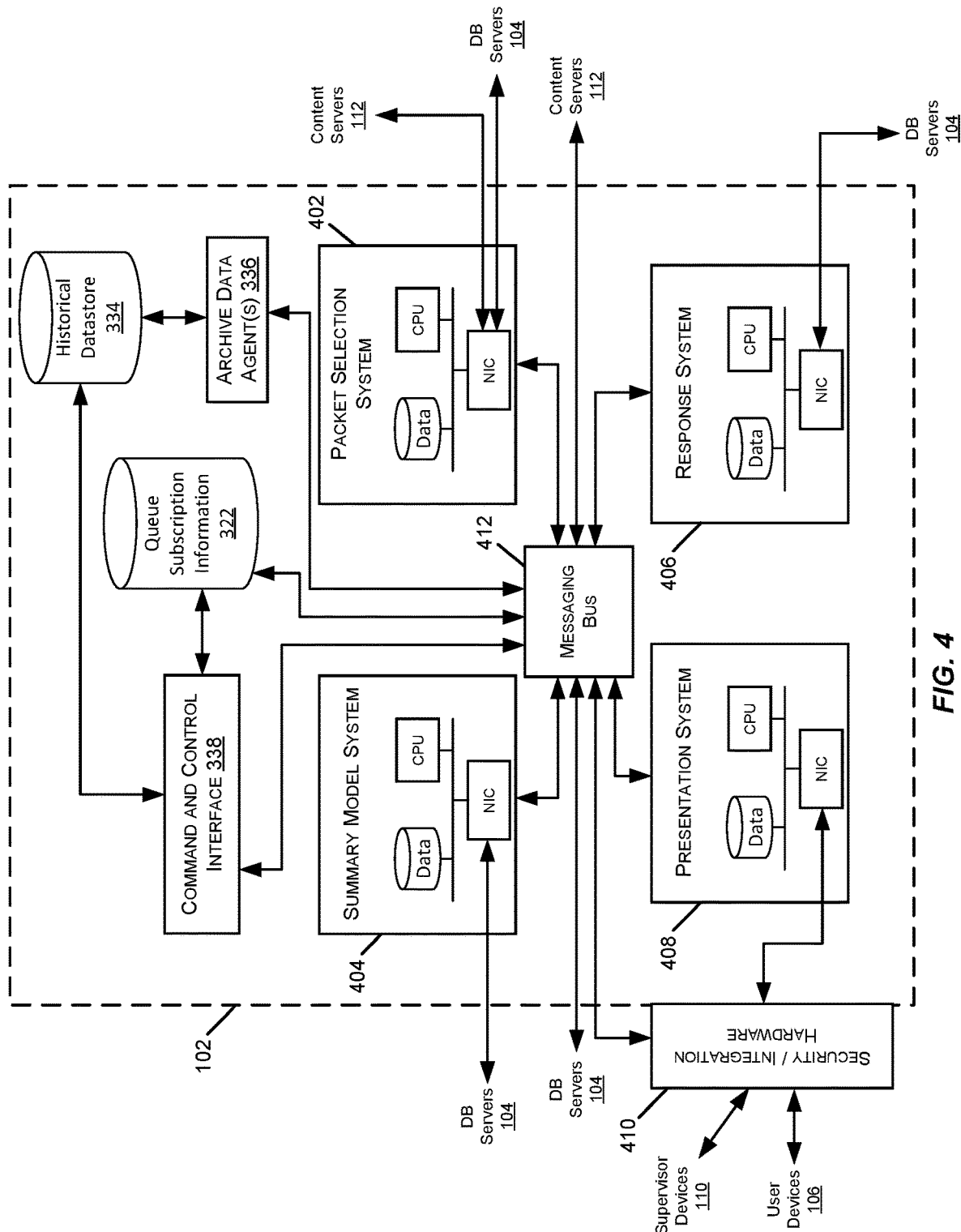
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. In such an embodiment, content management server 102 performs internal data gathering and processing of streamed content along with external data gathering and processing. Other embodiments could have either all external or all internal data gathering. This embodiment allows reporting timely information that might be of interest to the reporting party or other parties. In this embodiment, the content management server 102 can monitor gathered information from several sources to allow it to make timely business and/or processing decisions based upon that information. For example, reports of user actions and/or responses, as well as the status and/or results of one or several processing tasks could be gathered and reported to the content management server 102 from a number of sources.

Internally, the content management server 102 gathers information from one or more internal components 402-408. The internal components 402-408 gather and/or process information relating to such things as: content provided to users; content consumed by users; responses provided by users; user skill levels; content difficulty levels; next content for providing to users; etc. The internal components 402-408 can report the gathered and/or generated information in real-time, near real-time, or along another time line. To account for any delay in reporting information, a time stamp or staleness indicator can inform others of how timely the information was sampled. The content management server 102 can opt to allow third parties to use internally or externally gathered information that is aggregated within the server 102 by subscription to the content distribution network 100.

A command and control (CC) interface 338 configures the gathered input information to an output of data streams, also referred to herein as content streams. APIs for accepting gathered information and providing data streams are provided to third parties external to the server 102 who want to subscribe to data streams. The server 102 or a third party can design as yet undefined APIs using the CC interface 338. The server 102 can also define authorization and authentication parameters using the CC interface 338 such as authentication, authorization, login, and/or data encryption. CC information is passed to the internal components 402-408 and/or other components of the content distribution network 100 through a channel separate from the gathered information or data stream in this embodiment, but other embodiments could embed CC information in these communication channels. The CC information allows throttling information reporting frequency, specifying formats for information and data streams, deactivation of one or several internal components 402-408 and/or other components of the content distribution network 100, updating authentication and authorization, etc.

The various data streams that are available can be researched and explored through the CC interface 338. Those data stream selections for a particular subscriber, which can be one or several of the internal components 402-408 and/or other components of the content distribution network 100, are stored in the queue subscription information database 322. The server 102 and/or the CC interface 338 then routes selected data streams to processing subscribers that have selected delivery of a given data stream. Additionally, the server 102 also supports historical queries of the various data streams that are stored in an historical data store 334 as gathered by an archive data agent 336. Through the CC interface 338 various data streams can be selected for archiving into the historical data store 334.

Components of the content distribution network 100 outside of the server 102 can also gather information that is reported to the server 102 in real-time, near real-time, or along another time line. There is a defined API between those components and the server 102. Each type of information or variable collected by server 102 falls within a defined API or multiple APIs. In some cases, the CC interface 338 is used to define additional variables to modify an API that might be of use to processing subscribers. The additional variables can be passed to all processing subscribes or just a subset. For example, a component of the content distribution network 100 outside of the server 102 may report a user response, but define an identifier of that user as a private variable that would not be passed to processing subscribers lacking access to that user and/or authorization to receive that user data. Processing subscribers having access to that user and/or authorization to receive that user data would receive the subscriber identifier along with the response reported to that component. Encryption and/or unique addressing of data streams or sub-streams can be used to hide the private variables within the messaging queues.

The user devices 106 and/or supervisor devices 110 communicate with the server 102 through security and/or integration hardware 410. The communication with security and/or integration hardware 410 can be encrypted or not. For example, a socket using a TCP connection could be used. In addition to TCP, other transport layer protocols like Control Transmission Protocol (SCTP) and User Datagram Protocol (UDP) could be used in some embodiments to intake the gathered information. A protocol such as SSL could be used to protect the information over the TCP connection. Authentication and authorization can be performed to any user devices 106 and/or supervisor device interfacing to the server 102. The security and/or integration hardware 410 receives the information from one or several of the user devices 106 and/or the supervisor devices 110 by providing the API and any encryption, authorization, and/or authentication. In some cases, the security and/or integration hardware 410 reformats or rearranges this received information The messaging bus 412, also referred to herein as a messaging queue or a messaging channel, can receive information from the internal components of the server 102 and/or components of the content distribution network 100 outside of the server 102 and distribute the gathered information as a data stream to any processing subscribers that have requested the data stream from the messaging queue 412. As indicated in FIG. 4, processing subscribers are indicated by a connector to the messaging bus 412, the connector having an arrow head pointing away from the messaging bus 412. In some examples, only data streams within the messaging queue 412 that a particular processing subscriber has subscribed to may be read by that processing subscriber if received at all. Gathered information sent to the messaging queue 412 is processed and returned in a data stream in a fraction of a second by the messaging queue 412. Various multicasting and routing techniques can be used to distribute a data stream from the messaging queue 412 that a number of processing subscribers have requested. Protocols such as Multicast or multiple Unicast could be used to distributed streams within the messaging queue 412. Additionally, transport layer protocols like TCP, SCTP and UDP could be used in various embodiments.

Through the CC interface 338, an external or internal processing subscriber can be assigned one or more data streams within the messaging queue 412. A data stream is a particular type of messages in a particular category. For example, a data stream can comprise all of the data reported to the messaging bus 412 by a designated set of components. One or more processing subscribers could subscribe and receive the data stream to process the information and make a decision and/or feed the output from the processing as gathered information fed back into the messaging queue 412. Through the CC interface 338 a developer can search the available data streams or specify a new data stream and its API. The new data stream might be determined by processing a number of existing data streams with a processing subscriber.

The CDN 110 has internal processing subscribers 402-408 that process assigned data streams to perform functions within the server 102. Internal processing subscribers 402-408 could perform functions such as providing content to a user, receiving a response from a user, determining the correctness of the received response, updating one or several models based on the correctness of the response, recommending new content for providing to one or several users, or the like. The internal processing subscribers 402-408 can decide filtering and weighting of records from the data stream. To the extent that decisions are made based upon analysis of the data stream, each data record is time stamped to reflect when the information was gathered such that additional credibility could be given to more recent results, for example. Other embodiments may filter out records in the data stream that are from an unreliable source or stale. For example, a particular contributor of information may prove to have less than optimal gathered information and that could be weighted very low or removed altogether.

Internal processing subscribers 402-408 may additionally process one or more data streams to provide different information to feed back into the messaging queue 412 to be part of a different data stream. For example, hundreds of user devices 106 could provide responses that are put into a data stream on the messaging queue 412. An internal processing subscriber 402-408 could receive the data stream and process it to determine the difficulty of one or several data packets provided to one or several users and supply this information back onto the messaging queue 412 for possible use by other internal and external processing subscribers.

As mentioned above, the CC interface 338 allows the CDN 110 to query historical messaging queue 412 information. An archive data agent 336 listens to the messaging queue 412 to store data streams in a historical database 334. The historical database 334 may store data streams for varying amounts of time and may not store all data streams. Different data streams may be stored for different amounts of time.

With regards to the components 402-408, the content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a packet selection system 402. The packet selection system 402 may be implemented using dedicated hardware within the content distribution network 100 (e.g., a packet selection server 402), or using designated hardware and software resources within a shared content management server 102. In some embodiments, the packet selection system 402 may adjust the selection and adaptive capabilities of content resources to match the needs and desires of the users receiving the content. For example, the packet selection system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the packet selection system 402 may modify content resources for individual users.

In some embodiments, the packet selection system 402 can include a recommendation engine also referred to herein as an adaptive recommendation engine (not shown). In some embodiments, the recommendation engine can select one or several pieces of content, also referred to herein as data packets, for providing to a user. These data packets can be selected based on, for example, the information retrieved from the database server 104 including, for example, the user profile database 301, the content library database 303, the model database 309, or the like. In some embodiments, these one or several data packets can be adaptively selected and/or selected according to one or several selection rules. In one embodiment, for example, the recommendation engine can retrieve information from the user profile database 301 identifying, for example, a skill level of the user. The recommendation engine can further retrieve information from the content library database 303 identifying, for example, potential data packets for providing to the user and the difficulty of those data packets and/or the skill level associated with those data packets.

The recommendation engine can identify one or several potential data packets for providing and/or one or several data packets for providing to the user based on, for example, one or several rules, models, predictions, or the like. The recommendation engine can use the skill level of the user to generate a prediction of the likelihood of one or several users providing a desired response to some or all of the potential data packets. In some embodiments, the recommendation engine can pair one or several data packets with selection criteria that may be used to determine which packet should be delivered to a user based on one or several received responses from that student-user. In some embodiments, one or several data packets can be eliminated from the pool of potential data packets if the prediction indicates either too high a likelihood of a desired response or too low a likelihood of a desired response. In some embodiments, the recommendation engine can then apply one or several selection criteria to the remaining potential data packets to select a data packet for providing to the user. These one or several selection criteria can be based on, for example, criteria relating to a desired estimated time for receipt of response to the data packet, one or several content parameters, one or several assignment parameters, or the like.

A content management server 102 also may include a summary model system 404. The summary model system 404 may be implemented using dedicated hardware within the content distribution network 100 (e.g., a summary model server 404), or using designated hardware and software resources within a shared content management server 102. In some embodiments, the summary model system 404 may monitor the progress of users through various types of content resources and groups, such as media compilations, courses, or curriculums in training or educational contexts, interactive gaming environments, and the like. For example, the summary model system 404 may query one or more databases and/or data store servers 104 to retrieve user data such as associated content compilations or programs, content completion status, user goals, results, and the like.

A content management server 102 also may include a response system 406, which can include, in some embodiments, a response processor. The response system 406 may be implemented using dedicated hardware within the content distribution network 100 (e.g., a response server 406), or using designated hardware and software resources within a shared content management server 102. The response system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the response server 406 may analyze the information to determine the effectiveness or appropriateness of content resources with, for example, a subject matter, an age group, a skill level, or the like. In some embodiments, the response system 406 may provide updates to the packet selection system 402 or the summary model system 404, with the attributes of one or more content resources or groups of resources within the network 100. The response system 406 also may receive and analyze user evaluation data from user devices 106, supervisor devices 110, and administrator servers 116, etc. For instance, response system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

In some embodiments, the response system 406 can be further configured to receive one or several responses from the user and analyze these one or several responses. In some embodiments, for example, the response system 406 can be configured to translate the one or several responses into one or several observables. As used herein, an observable is a characterization of a received response. In some embodiments, the translation of the one or several response into one or several observables can include determining whether the one or several response are correct responses, also referred to herein as desired responses, or are incorrect responses, also referred to herein as undesired responses. In some embodiments, the translation of the one or several response into one or several observables can include characterizing the degree to which one or several response are desired responses and/or undesired responses. In some embodiments, one or several values can be generated by the response system 406 to reflect user performance in responding to the one or several data packets. In some embodiments, these one or several values can comprise one or several scores for one or several responses and/or data packets.

A content management server 102 also may include a presentation system 408. The presentation system 408 may be implemented using dedicated hardware within the content distribution network 100 (e.g., a presentation server 408), or using designated hardware and software resources within a shared content management server 102. The presentation system 408 can include a presentation engine that can be, for example, a software module running on the content delivery system.

The presentation system 408, also referred to herein as the presentation module or the presentation engine, may receive content resources from the packet selection system 402 and/or from the summary model system 404, and provide the resources to user devices 106. The presentation system 408 may determine the appropriate presentation format for the content resources based on the user characteristics and preferences, and/or the device capabilities of user devices 106. If needed, the presentation system 408 may convert the content resources to the appropriate presentation format and/or compress the content before transmission. In some embodiments, the presentation system 408 may also determine the appropriate transmission media and communication protocols for transmission of the content resources.

In some embodiments, the presentation system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrator servers 116, and other devices in the network 100.

Figure 5:
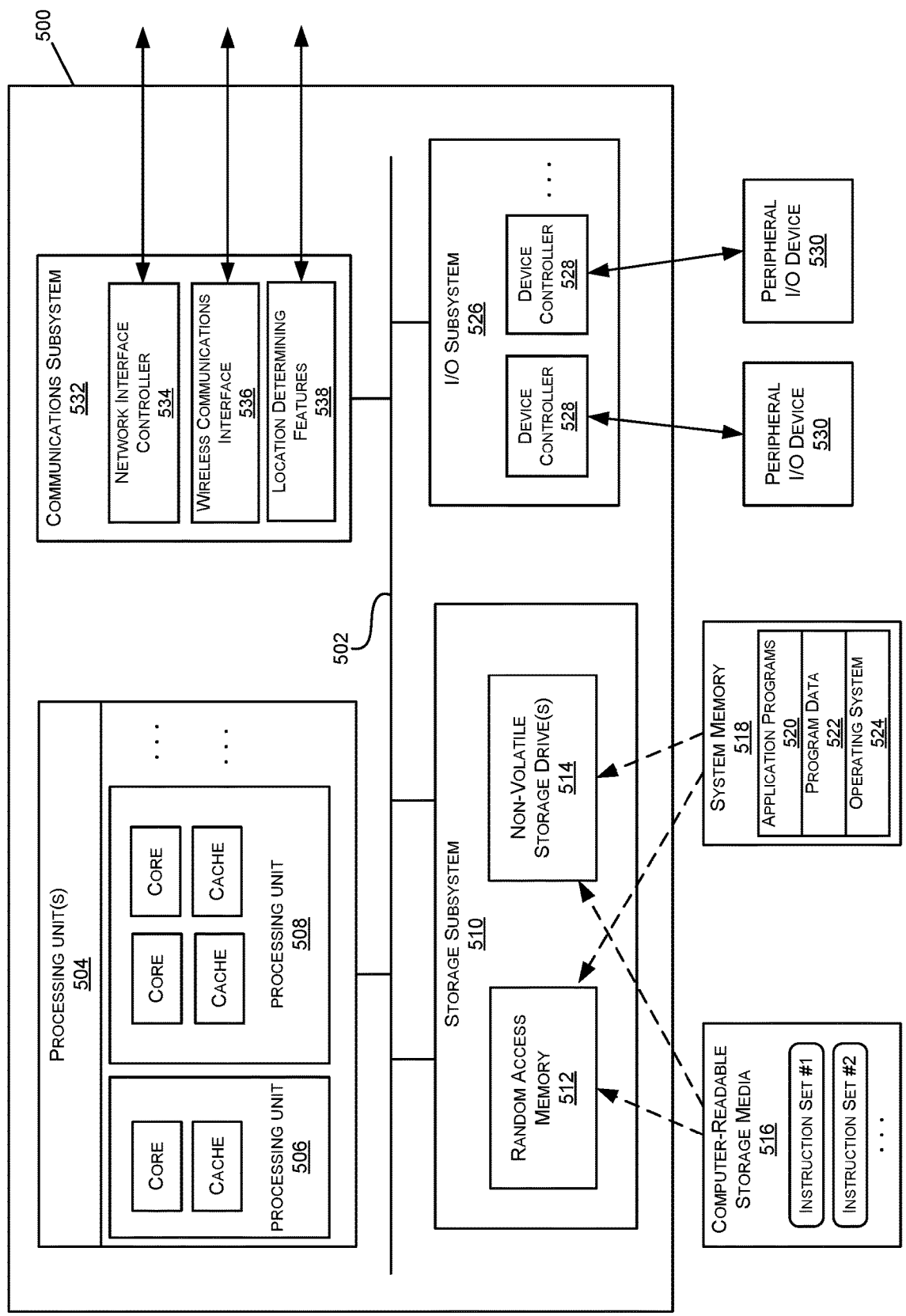
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics, and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 518 may be stored in volatile memory (such as random access memory (RAM) 512) and/or in non-volatile storage drives 514 (such as read-only memory (ROM), flash memory, etc.). The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 510 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as, but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., external data source 313). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
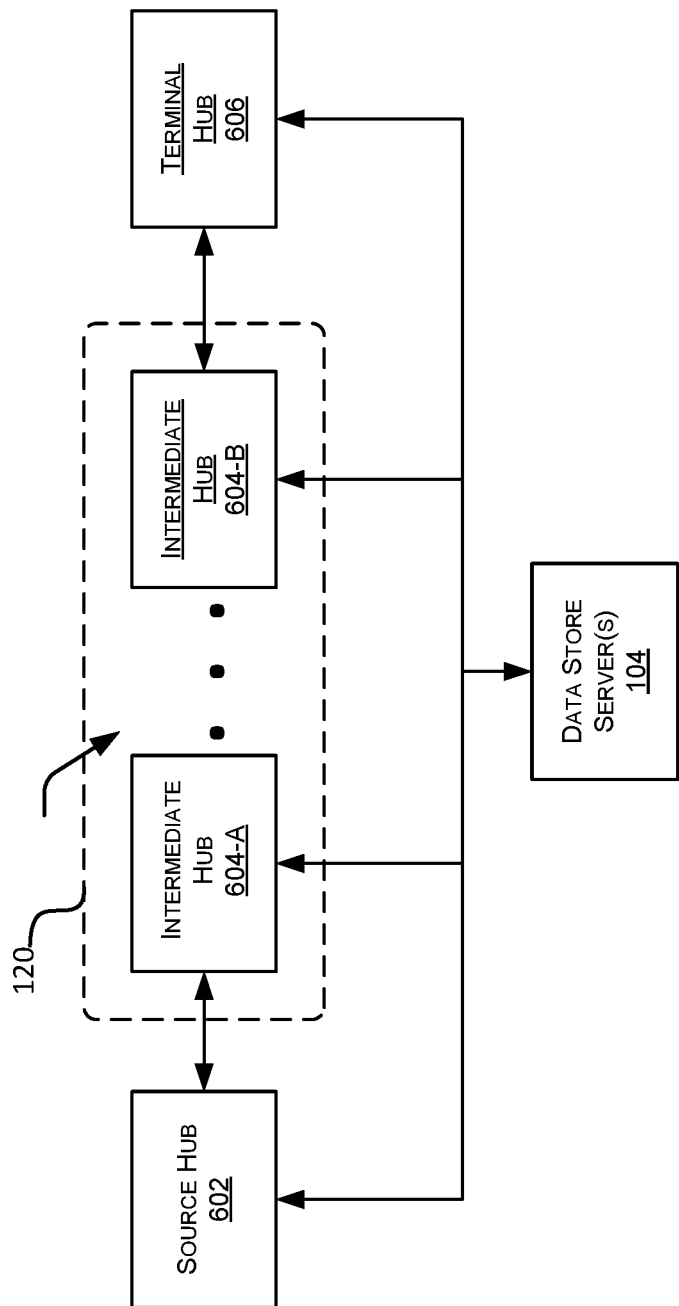
FIG. 6 is a block diagram illustrating one embodiment of the communication network.

With reference now to FIG. 6, a block diagram illustrating one embodiment of the communication network is shown. Specifically, FIG. 6 depicts one hardware configuration in which messages are exchanged between a source hub 602 and a terminal hub 606 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatively connected with the data store 104. In such an embodiments, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7:
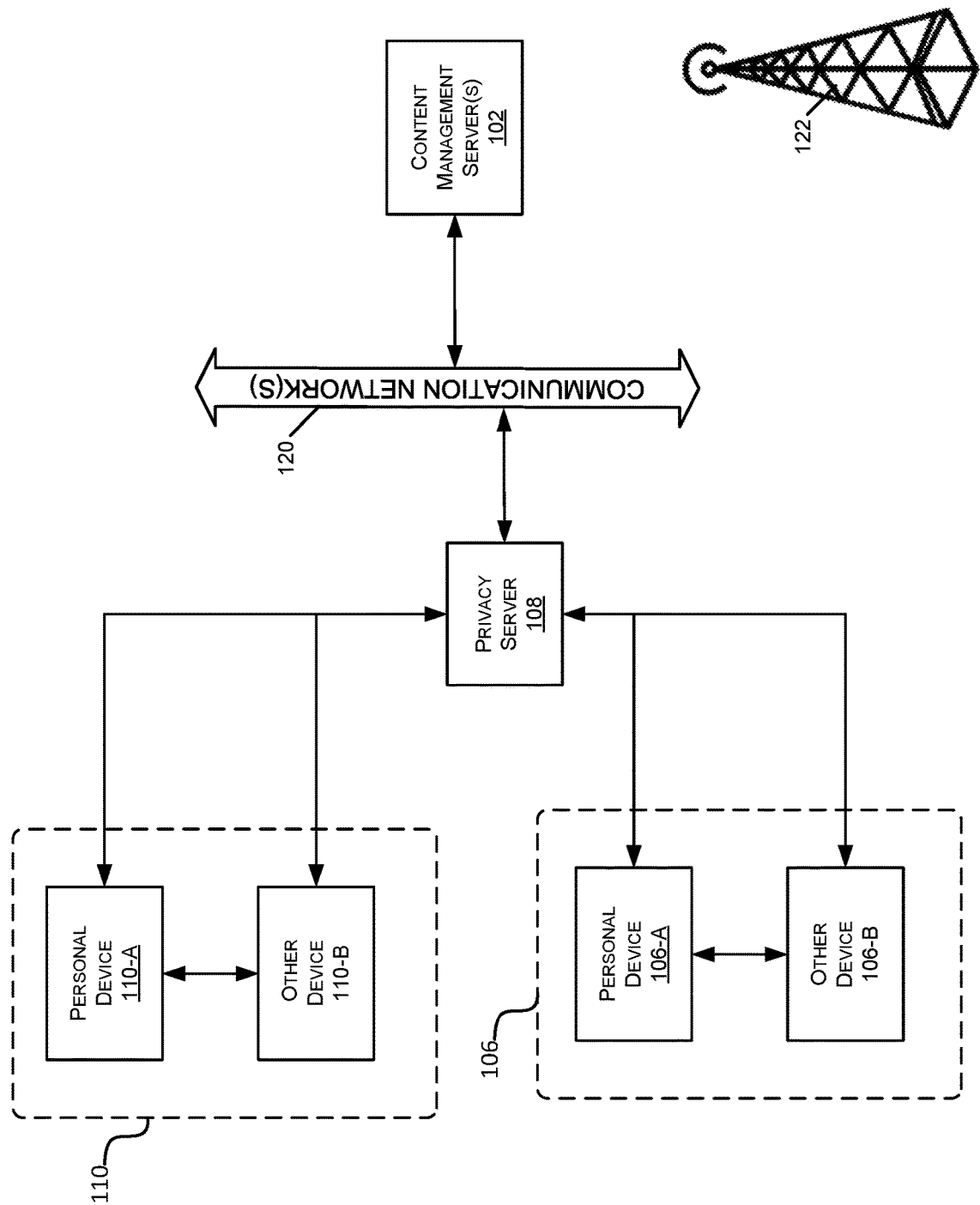
FIG. 7 is a block diagram illustrating one embodiment of user device and supervisor device communication.

With reference now to FIG. 7, a block diagram illustrating one embodiment of user device 106 and supervisor device 110 communication is shown. In some embodiments, for example, a user may have multiple devices that can connect with the content distribution network 100 to send or receive information. In some embodiments, for example, a user may have a personal device such as a mobile device, a smartphone, a tablet, a smartwatch, a laptop, a PC, or the like. In some embodiments, the other device can be any computing device in addition to the personal device. This other device can include, for example, a laptop, a PC, a smartphone, a tablet, a smartwatch, or the like. In some embodiments, the other device differs from the personal device in that the personal device is registered as such within the content distribution network 100 and the other device is not registered as a personal device within the content distribution network 100.

Specifically with respect to FIG. 7 in view of the devices illustrated with FIG. 1, the user device 106 can include a personal user device 106-A and one or several other user devices 106-B. In some embodiments, one or both of the personal user device 106-A and the one or several other user devices 106-B can be communicatively connected to the content management server 102 and/or to the navigation system 122. Similarly, the supervisor device 110 can include a personal supervisor device 110-A and one or several other supervisor devices 110-B. In some embodiments, one or both of the personal supervisor device 110-A and the one or several other supervisor devices 110-B can be communicatively connected to the content management server 102 and/or to the navigation system 122.

In some embodiments, the content distribution network can send one or more alerts to one or more user devices 106 and/or one or more supervisor devices 110 via, for example, the communication network 120. In some embodiments, the receipt of the alert can result in the launching of an application within the receiving device, and in some embodiments, the alert can include a link that, when selected, launches the application or navigates a web-browser of the device of the selector of the link to page or portal associated with the alert.

In some embodiments, for example, the providing of this alert can include the identification of one or several user devices 106 and/or student-user accounts associated with the student-user and/or one or several supervisor devices 110 and/or supervisor-user accounts associated with the supervisor-user. After these one or several devices 106, 110 and/or accounts have been identified, the providing of this alert can include determining an active device of the devices 106, 110 based on determining which of the devices 106, 110 and/or accounts are actively being used, and then providing the alert to that active device.

Specifically, if the user is actively using one of the devices 106, 110 such as the other user device 106-B and the other supervisor device 110-B, and/or accounts, the alert can be provided to the user via that other device 106-B, 110-B, and/or account that is actively being used. If the user is not actively using another device 106-B, 110-B, and/or account, a personal device 106-A, 110-A device, such as a smart phone or tablet, can be identified and the alert can be provided to this personal device 106-A, 110-A. In some embodiments, the alert can include code to direct the default device to provide an indicator of the received alert such as, for example, an oral, tactile, or visual indicator of receipt of the alert.

In some embodiments, the recipient device 106, 110 of the alert can provide an indication of receipt of the alert. In some embodiments, the presentation of the alert can include the control of the I/O subsystem 526 to, for example, provide an oral, tactile, and/or visual indicator of the alert and/or of the receipt of the alert. In some embodiments, this can include controlling a screen of the supervisor device 110 to display the alert, data contained in alert and/or an indicator of the alert.

Figure 8:
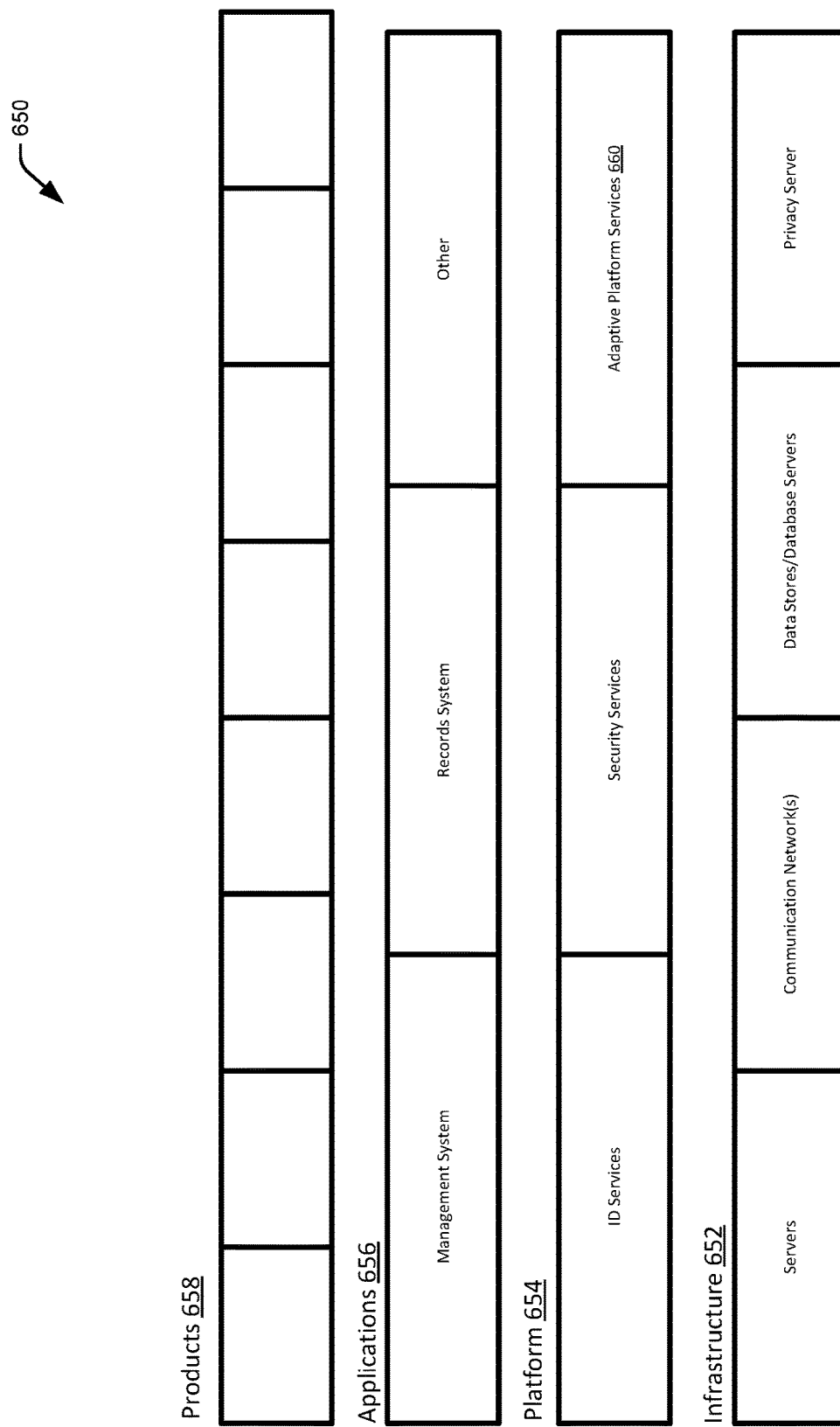
FIG. 8 is a schematic illustration of one embodiment of a computing stack.

With reference now to FIG. 8, a schematic illustration of one embodiment of an application stack, and particularly of a stack 650 is shown. In some embodiments, the content distribution network 100 can comprise a portion of the stack 650 that can include an infrastructure layer 652, a platform layer 654, an applications layer 656, and a products layer 658. In some embodiments, the stack 650 can comprise some or all of the layers, hardware, and/or software to provide one or several desired functionalities and/or productions.

As depicted in FIG. 8, the infrastructure layer 652 can include one or several servers, communication networks, data stores, privacy servers, and the like. In some embodiments, the infrastructure layer can further include one or several user devices 106 and/or supervisor devices 110 connected as part of the content distribution network.

The platform layer can include one or several platform software programs, modules, and/or capabilities. These can include, for example, identification services, security services, and/or adaptive platform services 660. In some embodiments, the identification services can, for example, identify one or several users, components of the content distribution network 100, or the like. The security services can monitor the content distribution network for one or several security threats, breaches, viruses, malware, or the like. The adaptive platform services 660 can receive information from one or several components of the content distribution network 100 and can provide predictions, models, recommendations, or the like based on that received information. The functionality of the adaptive platform services 660 will be discussed in greater detail in FIGS. 9-11, below.

The applications layer 656 can include software or software modules upon or in which one or several product softwares or product software modules can operate. In some embodiments, the applications layer 656 can include, for example, a management system, record system, or the like. In some embodiments, the management system can include, for example, a Learning Management System (LMS), a Content Management System (CMS), or the like. The management system can be configured to control the delivery of one or several resources to a user and/or to receive one or several responses from the user. In some embodiments, the records system can include, for example, a virtual gradebook, a virtual counselor, or the like.

The products layer can include one or several software products and/or software module products. These software products and/or software module products can provide one or several services and/or functionalities to one or several users of the software products and/or software module products.

Figure 9:
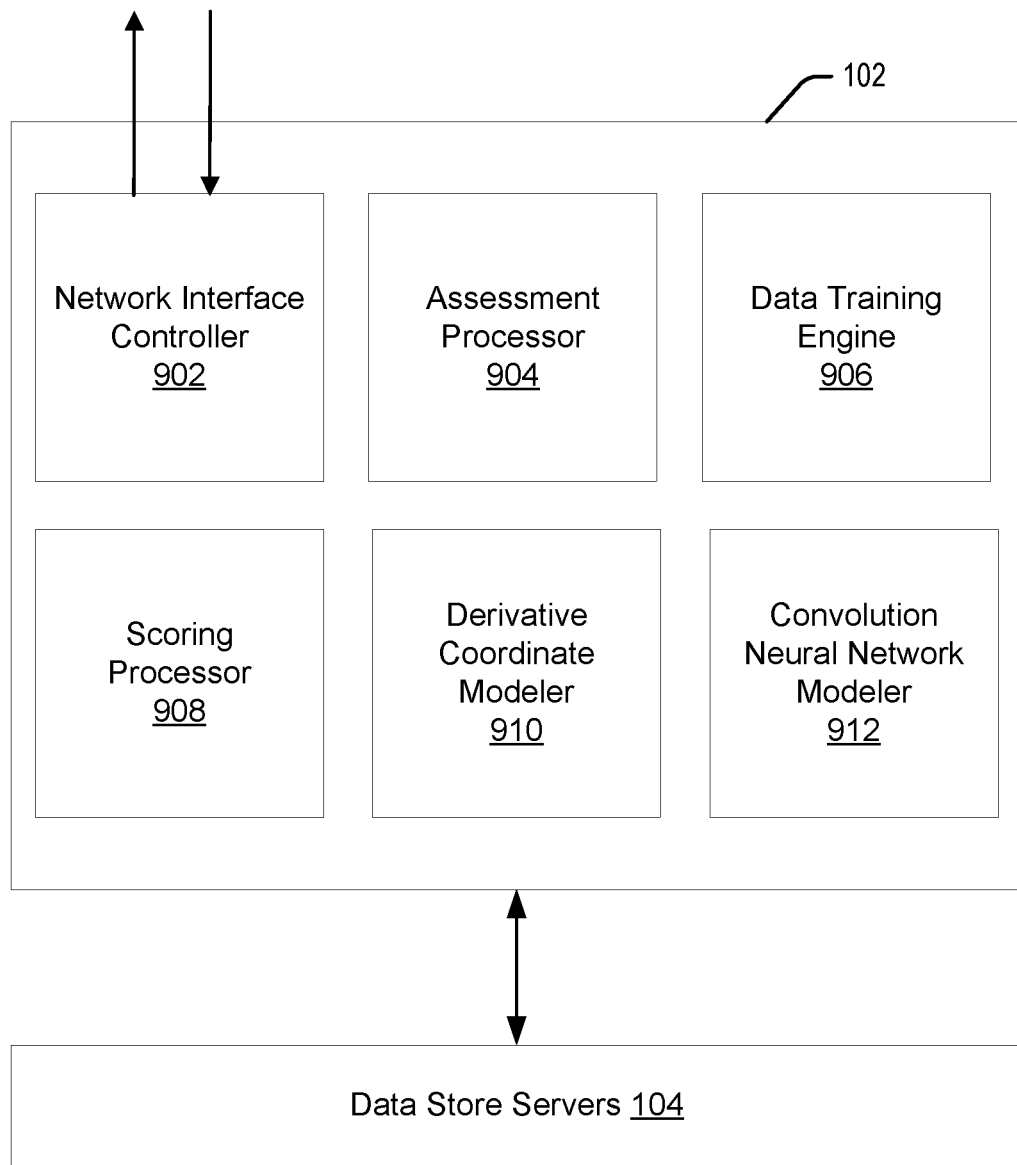
FIG. 9 is a block diagram illustrating an embodiment of one or more content management servers within a content distribution network according to an embodiment of the disclosure.

With reference now to FIG. 9, is a block diagram illustrating an embodiment of one or more content management servers within a content distribution network according to an embodiment of the disclosure. The content management server 102 may comprise one or more additional or alternative engines than embodiments previously discussed, including a network interface controller 902, assessment processor 904, data training engine 906, scoring processor 908, derivative coordinate modeler 910, and convolution neural network modeler 912. In some examples, the content management servers 102 may correspond to any other combination of engines described throughout the application to implement features described herein.

The content management servers 102 may comprise a network interface controller 902. The network interface controller 902 may transmit and receive data using a specific physical layer and data link layer standard. The data may be received from a user interface at a user device and transmitted via a communication network to the network interface controller 902. In some examples, an assessment application may be installed at the user device to enable the data retrieval and transmission. When the one or more user devices access the assessment application to provide data, the data from the assessment applications may be transmitted from the user device and received at the content management servers 102 via the network interface controller 902.

The content management servers 102 may also comprise an assessment processor 904. The assessment processor 904 may generate text, images, audio, video, or other digital data to initiate and interaction from the user. The data may comprise a test item associated with an assessment. In some examples, the assessment processor 904 may receive one or more responses to the provided test item as part of the assessment.

The test items generated by the assessment processor 904 may be stored in a test item data store associated with the data store server 104. The test item data store may comprise the text, images, audio, video, or other digital data used to provide to the user during the assessment and may be transmitted via communication network to an assessment application at a user device for presentation at the user device. Examples of test item data is provided throughout this disclosure, including at FIG. 12.

In some examples, the assessment processor 904 may adjust data based on a previous answer to a test item from one or more users. As a simple illustration, first data presented to the user may comprise an image of the bed and provoke the user to interact with the user interface to describe the image of the bed, including the letters "B-E-D." The user may provide the correct letters as requested in a correct order, or the user may provide incorrect letters or an incorrect order, including "D-E-D" or "B-D-E." Second data presented to the user may be adjusted based on the response of the first data, as determined by the assessment processor 904. In this example, the assessment processor 904 may generate first data and multiple options for second data, then store these data at the test item data store. During the assessment, a first response to the first data may trigger a second data transmission and a second response to the second data may trigger a third data transmission. Additional details are provided with FIGS. 18-19.

In some examples, the assessment processor 904 may adjust data based on other interactive attributes. For example, a time threshold may be associated with presenting the first data. The time between presenting the first data and receiving the complete response from the user may be calculated. When the user provides a response to the first data outside the time threshold, second data may be adjusted based at least in part on the timing of the response (e.g., providing a test item associated with fewer letters to reduce the amount of time taken between presenting data and receiving a response, or assessing different letters in a subsequent test item, etc.).

The assessment processor 904 may also be configured to provide second test items and receive second test responses. The first and second test responses may be provided as digital representations of handwritten user input associated with each of the corresponding test items. The assessment processor 904 may be configured to analyze the user responses using an automated handwriting assessment method (as described with the derivative coordinate modeler 910 and the convolution neural network modeler 912) and determine a response score based on the analysis using a model ground truth scoring method (as described with the scoring processor 908) in addition to an assessment of character-level accuracy, word-level accuracy without a dictionary, and word-level accuracy with a dictionary. In some examples, the automated handwriting assessment method may analyze the handwritten user input using only one of these assessments (e.g., word-level accuracy with a dictionary, etc.).

The assessment processor 904 may receive data from the test item data store and provide one or more test items to multiple user devices at substantially the same time. For example, the assessment processor 904 may determine a first test item to transmit to a plurality of user devices. The plurality of user devices may be associated as a group or a class identified in a profile associated with the data store servers 104. The profile may identify the user devices by a user device identifier, including an Internet protocol (IP) address or other identifier associated with the user device. The first test item may be selected to correspond with the plurality of user devices. In some examples, subsequent test items may correspond with the individual user devices or may correspond with a group or class overall.

The assessment processor 904 may transmit the one or more test items to the user devices in association with a start time of an assessment. For example, the one or more test items may be transmitted at the start time and track dynamically by the assessment processor 904. In some examples, the one or more test items may be transmitted to the user devices prior to the start time of the assessment and stored in a memory at each of the user devices. In this example, the user device may access the local memory to retrieve the one or more test items and provide the one or more test items to a user interface at the start time of the assessment.

The start time of the assessment may be tracked by the assessment application at the user device and/or by the assessment processor 904 to synchronize the start time between the two devices. The time of the assessment may be displayed at the user interface of the user device.

The content management servers 102 may also comprise a data training engine 906. The data training engine 906 may receive a training data set comprising one or more model test items and model test responses from the test item data store. In some examples, the model test item may be associated with a plurality of letters to spell a word associated with model test item and the model test response may comprise a digital representation of handwritten user input associated with model test item. In some examples, the model test item may resemble test item data illustrated in FIG. 12.

The data training engine 906 may provide a model test item to an assessment application of the user device and receive the model test response associated with the model test item, both via the network interface controller 902. In some examples, the transmission of the model test item may be limited to a different set of user devices than the user devices that receive test items during the assessment. In some examples, the model test item may be provided before or after the assessment (e.g., as part of a training data collection) and stored as a training data set associated with data store servers 104.

In some examples, the data training engine 906 may receive a model test response and assign a score to the model test response. The model test response and corresponding score may be stored in a training data set associated with the data store servers 104. A plurality of model test responses and model scores may be stored and used to compare with other received test responses to determine scores.

In some examples, the data training engine 906 may parse each letter of a model test response and determine a model score for the individual letters. A summation of the model scores may be calculated to determine a model score for a complete word comprising a plurality of letters that are individually scored. In some examples, a separate score may be calculated associated with the word overall without consideration for individual letters.

After an assessment, the model test responses may be compared with test responses to find the most similar match. When a substantially similar match is determined from the model test responses, the model score corresponding with the match may be assigned to the test response as a test response score using the scoring processor 908.

The content management servers 102 may also comprise a scoring processor 908. The scoring processor 908 may determine a model response score based on an analysis of the model test item, or may determine a response score associated with the test item and test response. In some examples, the scoring processor 908 may determine a model ground truth scoring method that correlates the model response score with the training data set.

The model ground truth scoring method may generate a model ground truth scoring method that correlates the model response score with the training data set. In some examples, the model response score may be determined by a human assessor or in-house annotator. In some examples, the model response score may be determined by a relative comparison between multiple model responses and ranking the model responses along a scale. In still some examples, the model ground truth scoring method may generate a model score and annotate responses with the score for secondary scoring evaluation.

In some examples, the scoring processor 908 may be configured to analyze individual letters in digital representations of handwritten user input or spelling of the digital representations of handwritten user input to help determine the score for the test response.

The scoring processor 908 may analyze each parsed letter. Parsed letters may help determine accuracy of spelling when compared with the model test response. In some examples, the spelled word and individual letters are each compared with the model answer to determine to the response score.

In some examples, the scoring processor 908 may analyze the model test response and determine a score for the word overall. For example, instead of scoring individual letters to determine a character-level accuracy, the scoring processor 908 may determine a word-level accuracy. The scoring processor 908 may determine the accuracy of the response without a dictionary (e.g., all letters may be correct to determine whether the word is correct, etc.) or with the dictionary (e.g., all letters from the response may be compared with all predicted words in the dictionary, etc.). When a dictionary is used, an edit distance may be calculated between the predicted word and all words in the dictionary. The scoring processor 908 may estimate the chosen word with the lowest edit distance as the final prediction.

The analysis may be used to determine a likelihood of a word received as handwritten user input at the user interface of the user device. Additional details of this analysis and assessment method are provided with FIG. 13.

The model ground truth scoring method may identify a model response for a plurality of model test responses by querying a group of users. For example, a model response may be provided to the group of users and one or more of the group of users may respond with a model score associated with the model response. The scores from the group of users may be averaged or otherwise calculated to determine the model response score for the group. For example, in response to providing a model test item, the scoring processor 908 may receive a first model response and a second model response. The group of users may each correlate a first score with the first model response and a second score with the second model response. An average of the first scores may be calculated to determine the model response score for the first model response, and an average of the second scores may be calculated to determine the model response or for the second model response.

The scoring processor 908 may compare the model test response with the test response to determine the response score. For example, a plurality of model test responses may correspond with a single model test item and each of the plurality of model test responses may correspond with a model response score. The scoring processor 908 may compare the test response to the plurality of model test responses to determine which of the model test responses is most similar to a test response, by implementing an optical character recognition (OCR) process or other image analysis. The most similar comparison between the test response and the plurality of model test responses may be identified, and the corresponding score with the identified model test response may be correlated to the test response as the response score.

The content management servers 102 may also comprise a derivative coordinate modeler 910. For each word sample, the derivative coordinate modeler 910 may determine X and Y coordinates from the digital representation of the handwritten user input. First and second derivatives of the X and Y coordinates may be extracted, which can generate a feature set, including a 4-dimensional feature set. The observation window width may be limited to three, but other embodiments may implement a different observation window. For each of the letters, the derivative coordinate modeler 910 may process the training data set with one or more states (e.g., thirteen), where each state's observation score comprises mixture components (e.g., sixteen). A separate model may be generated for analyzing the leading and trailing blanks for each test item or test response. Word level recognition results may be generated from character level hypotheses constrained by the vocabulary range and word spellings (e.g., from a word dictionary). Additional details of this analysis and assessment method are provided with FIGS. 14-15.

The content management servers 102 may also comprise a convolution neural network modeler 912. The convolution neural network modeler 912 may implement a heuristic segmentation method. For example, the digital representation of the handwritten user input may be analyzed to determine individual strokes. The strokes may correspond with a test response associated with the test item.

In some examples, the convolution neural network modeler 912 may normalize the test response by removing very short strokes, dots, and/or correcting the strokes by estimating slants of all strokes (e.g., by linear regression). The normalization may begin with a top left point of the digital representation of the handwritten user input and segment the individual strokes or characters as connected components. Each letter may be normalized to the same size and padded with small blank space.

Individual letters may be normalized by moving at least a portion of the letter with respect to other letters in a word. For example, the letter "Y" of "BABY" may originally be placed by the user along a lower gridline. The letter may be normalized to an upper position of the gridline with respect to the other letters in the word to place the letter along a same height as other letters in the word. This may provide a response with a balanced layout (e.g., resulting with a higher score).

The convolution neural network modeler 912 may, after the segmentation, filter words so that the number of segmented characters is the same as the number of characters of the corresponding model test item or training data set. In some examples, the convolution neural network modeler 912 may normalize each letter (e.g., to 32*32 gray image) and implement a training data process by feeding the training data set to a convolution layer (e.g., with 20 filter kernels of size 5*5), followed by a max-pooling layer (e.g., with kernel size of 2*2), followed by a second convolution layer (e.g., with 50 filter kernels of size 5*5), followed by second max-pooling layer (e.g., with kernel size of 2*2). The output of the method may fed into a fully connected layer (e.g., with approximately 500 neurons). Additional details of this analysis and assessment method are provided with FIG. 16.

Figure 10:
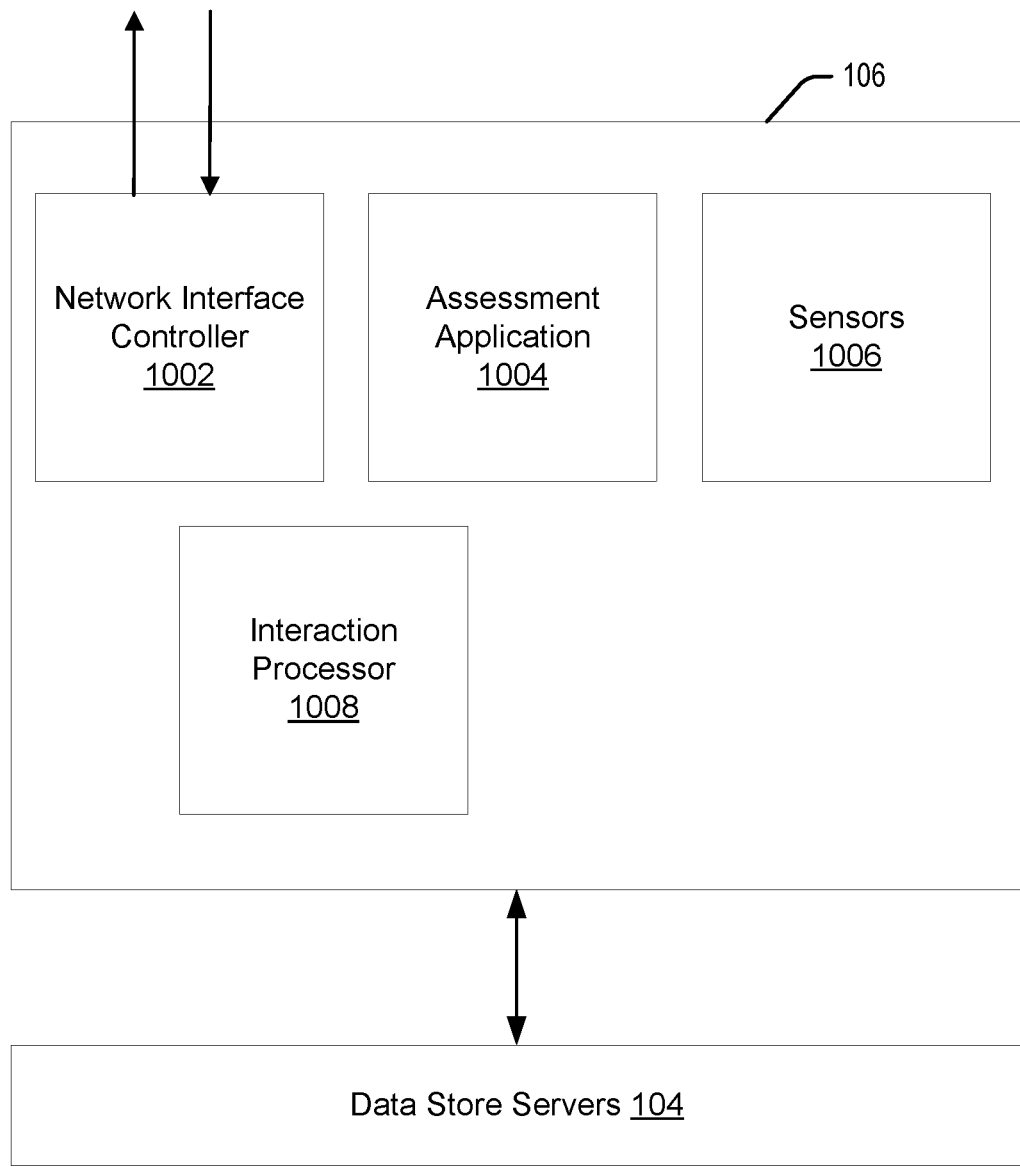
FIG. 10 is a block diagram illustrating an embodiment of one or more user devices within a content you should network according to the embodiment of the disclosure.

With reference now to FIG. 10, is a block diagram illustrating an embodiment of one or more user devices within a communication network according to the embodiment of the disclosure. The user device 106 may comprise one or more additional or alternative engines than the embodiments previously discussed, including a network interface controller 1002, assessment application 1004, one or more sensors 1006, and an interaction processor 1008. In some examples, the user device 106 may correspond to any combination of engines described throughout the application to implement features described herein.

The user device 106 may comprise a network interface controller 1002. The network interface controller 1002 may transmit and receive data using a specific physical layer and data link layer standard. The data may be received via a user interface at a user device, for example, using one or more sensors 1006, and transmitted via a communication network. In some examples, an assessment application 1004 may be installed at the user device to enable the data retrieval and transmission. In some examples, the assessment application 1004 may be accessible via a network application browser and not stored locally at the user device (e.g., other than a temporary cache, etc.).

The user device 106 may also comprise an assessment application 1004. The assessment application 1004 may provide one or more test items and receive one or more test responses. The test items and test responses may be enabled to be displayed at a user interface of the user device. In some examples, the test items and test responses may be provided and received audibly without diverting from the scope of the disclosure.

The assessment application 1004 may provide a timer. The timer may provide a time associated with an assessment for display at the user interface. In some examples, the timer may correspond with functionality to block or allow entry of handwritten user input associated with an assessment within a start time and end time provided by the timer.

The assessment application 1004 may transmit data to and from the content management servers 102. For example, the assessment application 1004 (via the network interface controller 1002) may receive one or more test items dynamically during an assessment or prior to initiating the assessment to store at a local memory of the user device. At a start time of the assessment, or any other time identified by the assessment application 1004, a first test item may be presented to the user via the user interface. The user interface may receive interactions in response to providing the first test item, including handwritten user input. Digital representations of the handwritten user input may be transmitted by the assessment application 1004 back to the content management servers 102 dynamically or at a predetermined time associated with the assessment.

The assessment application 1004 may track handwritten user input, time, or other interactions with the user interface. In some examples, the handwritten user input may comprise a series of strokes and the strokes may be stored in one or more data store servers 104 associated with content management servers 102 or locally at the user device (e.g., temporarily for backup, in a cache, etc.). A sample assessment application 1004 is illustrated with FIG. 12.

The user device 106 may also comprise one or more sensors 1006. The interactions with the assessment application 1004 may be received via the one or more sensors 1006. The sensors may comprise a touch-based sensors (e.g., tactile), image-based sensors, audio-based sensors, and/or other sensors known in relevant systems.

The one or more sensors 1006 may comprise resistive touch-based sensors or capacitive screen sensors. For example, the touch-based sensors may receive pressure at the user interface, or identify interactions with the user interface that are generated by light, electricity, or magnetism (e.g., human skin). In some examples, the touch-based sensor may receive the pressure from a user's finger as it presses against the user interface at the user device. A representation of the interaction may be provided as a digital representation of the points of the user interface where the user has touched. The interaction at the user interface may be received by the electronic tactile sensor which may be converted to the digital representation of the user input at the user device. The digital representation may be stored as one or more layers.

The one or more sensors 1006 may also comprise image-based sensors or audio-based sensors. These sensors may receive images and/or audio through a digital camera or camera modules incorporated with the user device (e.g., a built-in camera, a stand-alone camera communicatively coupled with the user device, etc.). These sensors may store the images and/or audio of the user during the assessment for analysis of the interactions of the user with the user device that are different than touch-based interactions with the user interface.

The user device 106 may also comprise an interaction processor 1008. The interaction processor 1008 may determine handwritten user input. For example, the interaction processor 1008 may identify a start of an interaction (e.g., the moment when the user's finger touches the user interface or starts talking) and end of an interaction (e.g., the moment when the user's finger stops touching user interface or stops talking after a threshold period of time) as the handwritten user input. In some examples, the interaction processor 1008 may store each of the interactions, comprising interactions with user interface between a start and end of each interaction, in a separate digital layer. Multiple, separate, digital layers may be combined (e.g., overlaid to form combined digital layers as an image). The combined image may form a letter, character, or a word associated with a test item.

The interaction processor 1008, in some examples, may identify an X and Y coordinate associated with the interaction. For example, a digital representation of the handwritten user input may be associated with a digital layer for tracking the X-coordinate and Y-coordinate of a portion of the user input. In some examples, an individual letter or character of the handwritten user input may be analyzed to determine the X-coordinate and Y-coordinate for that character. In other examples, the X-coordinate and Y-coordinate may correspond with an individual layer identified between a start and end of an interaction with the user interface.

The interaction processor 1008, in some examples, may analyze an acceleration. For example, a user may provide a relatively slow interaction in response to the first test item and speed up the interaction in response to the same first test item. The speed of the interaction may be tracked between a start of an interaction and an end of the same interaction. The speed of the interaction may be tracked at different points of time, such that the speed at a first time unit may be determined in the speed at a second time unit may be determined, and stored by the interaction processor 1008. The delta or change between the two time units may be identified as the acceleration.

In some examples, the interaction processor 1008 may temporarily store the interaction data at a local memory of the user device or with an interaction data store associated with the data store servers 104. The determination of storing the interaction data at the local memory or at an interaction data store may depend at least in part on various attributes of the assessment (e.g., network connection consistency above a threshold value or duration of time, whether the assessment is dynamic or static, etc.). In some examples, the interaction data may be initially stored at the local memory in transmitted to the data store servers 104 upon identification of a network connection above the threshold.

Figure 11:
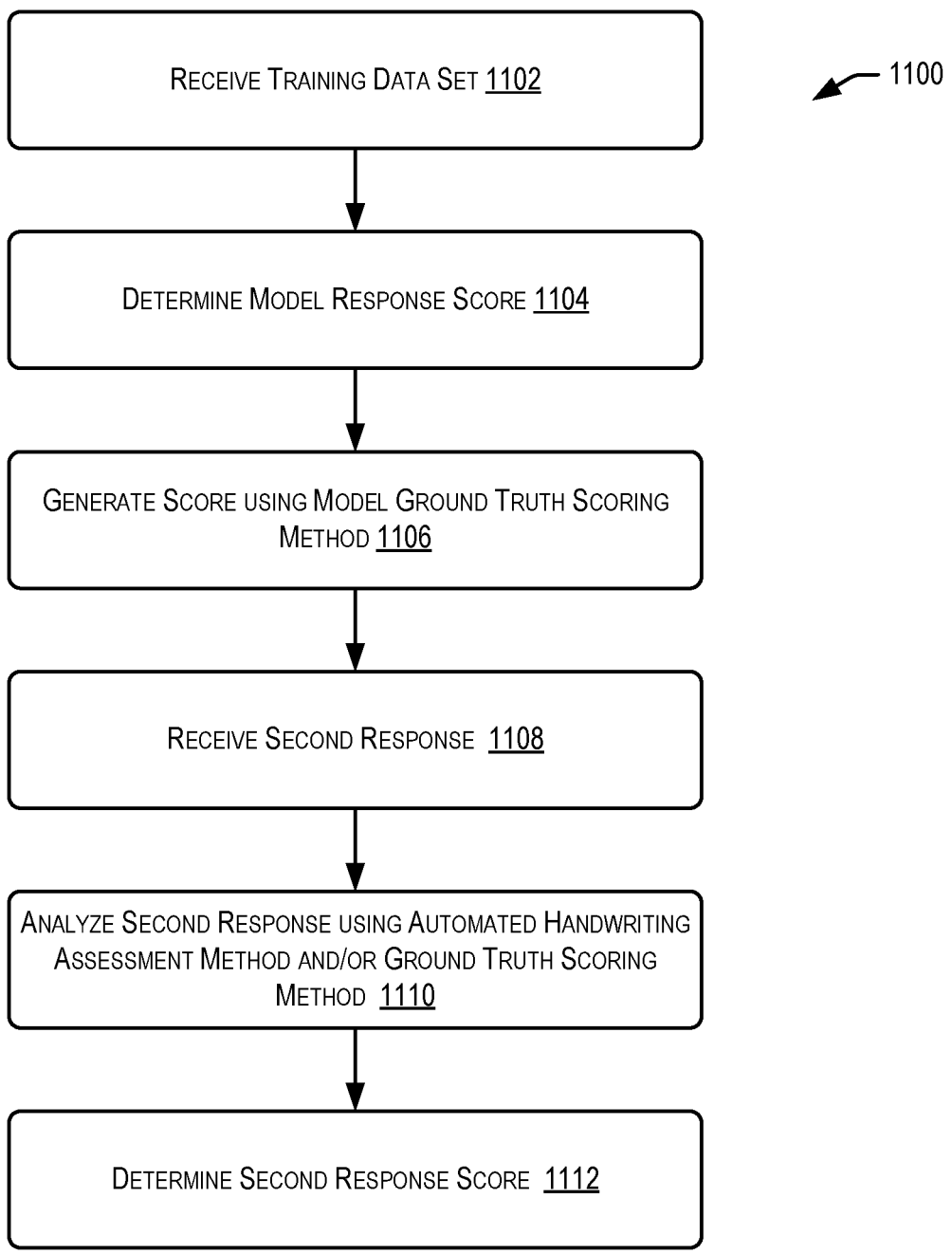
FIG. 11 is a flow diagram illustrating a process of providing an assessment to user according to an embodiment of the disclosure.

With reference now to FIG. 11, a flow diagram illustrating a process of providing an assessment to user according to an embodiment of the disclosure is provided. In illustration 1100, a process may be implemented in various distributed or consolidated systems described herein, including a content distribution network 100, the content management server 102, user devices 106, or supervisor devices 110.

At 1102, a training data set may be received. For example, the content management server 102 and/or the one or more processors associated with the content management server 102 may receive the training data set comprising at least a model test item and a model test response. In some examples, the model test item may be associated with a plurality of letters to spell a word associated with a model test item or may comprise a complete word associated with the model test item where the individual letters are not recognized. In some examples, the model test response may comprise a first digital representation of handwritten user input associated with the model test item.

At 1104, a model response score may be determined. The model response score may be based on an analysis of the model test item and/or the model test response. For example, a human assessor may determine that the model response score associated with the model test response. In some examples, the model response score may be a relative score when ranking the model test response with other model test responses along a score range.

At 1106, a score using a model ground truth scoring method may be generated. For example, a model response score may be determined, in some examples, by a human assessor or in-house annotator. The model response score may be determined by a relative comparison between multiple model responses and ranking the model responses along a scale. In some examples, the model ground truth scoring method may generate a model score and annotate responses with the score for secondary scoring evaluation. In some examples, the model ground truth scoring method may average multiple scores in order to determine a model ground truth score associated with a response.

One or more additional test items may be provided to one or more user devices as part of an assessment. In some examples, a first test item may be provided to the user device. The determination of the second test item (to provide to the user device) may depend at least in part on the first response to the first test item. The content management server 102 may conduct a real-time analysis and alter the assessment based at least in part on the real-time analysis.

In some examples, the real-time analysis may complete prior to providing the second test item, at least in part to determine which second test item to provide to the user device. The second test item may be retrieved from a local memory at the user device or may be transmitted from the content management server 102 for display at the user device.

At 1108, a second response may be received. For example, the content management server 102 and/or the one or more processors associated with the content management server 102 may receive the second response comprising a second digital representation of handwritten user input associated with a second test item. The first test item and the second test item may be different (e.g., for each user device that is receiving the first test item and the second test item, etc.), and the first digital representation of handwritten user input and the second digital representation of handwritten user input may be different as well.

At 1110, the second response may be analyzed. For example, the content management server 102 and/or the one or more processors associated with the content management server 102 may analyze the second response using an automated handwritten assessment method and the model ground truth scoring method. The automated handwritten assessment method may comprise the derivative coordinate assessment method or the convolution neural network assessment method.

At 1112, a second response score may be determined. For example, the content management server 102 and/or the one or more processors associated with the content management server 102 may determine the second response score based on the analysis of the second response, including using the automated handwritten assessment method and the model ground truth scoring method.

In some examples, the analysis of the second response may comprise analyzing individual letters in the second digital representation of the handwritten user input, analyzing the spelling in the second digital representation of the handwritten user input, analyzing a complete second digital representation of the handwritten user input with a model of handwritten user input of the correct second response, or analyzing other interaction data. Other interaction data may include the acceleration data associated with the interactions between the user device and the user. In some examples, this analysis may help determine, alone or in combination, a likelihood of the word as corresponding with the second response to a test item presented at the user interface of the user device.

Figure 12:
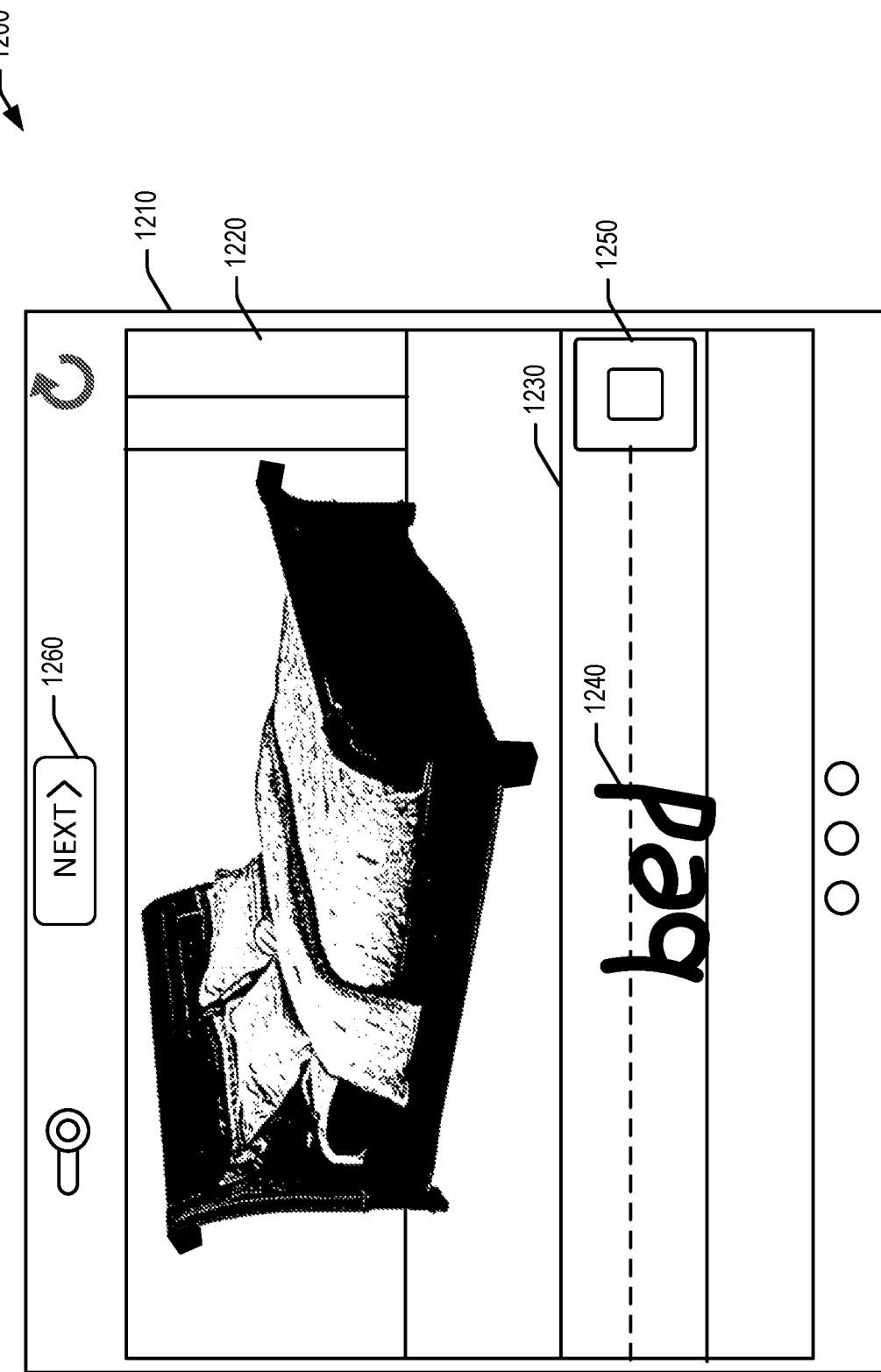
FIG. 12 is an illustrative test item and test response according to an embodiment of the disclosure.

With reference now to FIG. 12, an illustrative test item and test response according to an embodiment of the disclosure are provided. In illustration 1200, a user interface is provided at a user device 106. The user interface may provide a display for an assessment application 1210 that is installed locally at the user device 106. The assessment application 1210 may be alternatively accessible via a browser application with the data communicated from the content management server 102 via a communication network, where the assessment application 1210 may be provided via a communication channel with the content management server 102.

The assessment application 1210 may provide a test item 1220 or a model test item. In illustration 1200, the test item 1220 may comprise an image and/or a prompt for the user to provide one or more letters or a word that correspond with the image. In some examples, the test item 1220 may comprise text, audio, video, or other digital data used to provide to the user during the assessment.

The assessment application 1210 may comprise guidelines 1230 for accepting handwritten user input at the user interface. The guidelines 1230 may comprise two solid parallel lines with a dashed line in between the two solid parallel lines along the horizontal axis. The layout of the guidelines may vary, and in some examples, may resemble guidelines from a piece of paper used in other standardized handwriting assessments, but may be implemented with greater than or fewer lines than illustrated herein. The user may respond to the test item 1220 with the test response within and around the lines along the horizontal axis (e.g., when a threshold distance of the lines). The guidelines 1230 may identify a limited, interactive area of the assessment application 1210 for accepting handwritten user input. In some examples, other portions of the assessment application may receive interactive data as well.

In some examples, the dashed, horizontal line within the parallel lines along the horizontal axis may help a user identify a middle of a letter when providing the handwritten user input. For example, the upper solid parallel line may identify an area where the top of certain letters may be provided and the lower solid parallel line may identify an area where the bottom of certain letters may be provided. As illustrated with the letter "B," the top of the "B" may reach the top solid parallel line and the bottom of the "B" may reach the lower solid parallel line. The middle of the letter may exist around the dashed parallel line in order to handwrite the letter "B" with proper height and spacing according to some handwriting standards.

The assessment application 1210 may accept handwritten user input 1240 within and around the guidelines 1230. The handwritten user input 1240 may be received by a touch-based sensor at the user device through a direct interaction from a user's finger as it presses against the user interface at the user device. In some examples, the handwritten user input 1240 may be provided using a tool that is pressed against the user interface, including a pen or stylus. The coordinates of each portion of the handwritten user input 1240 may correspond with physical coordinates where the user's finger has interacted with the user interface.

The assessment application 1210 may provide a digital representation of the interaction received from the user. For example, when the user presses their finger or tool at a particular coordinate (e.g., "1, 1" along an X/Y axis), a dot may be provided where the interaction occurred. A solid line may be formed when the finger or tool moves. The line may be stopped at a subsequent interaction or trigger (e.g., the user activates a navigation tool, a timer expires for the particular test item, etc.). For example, the user may drag their finger or tool to a second coordinate (e.g., "1, 0" along an X/Y axis) as part of the interaction. The digital representation of the handwritten user input on the user interface may comprise a line between the two coordinates. Other interactions with the user interface may comprise dots, dashes, curves, letters, numbers, and the like. The combination of the digital representations of handwritten user input may resemble a letter or word that corresponds with the test item 1220 or model test item displayed by the assessment application 1210.

The assessment application 1210 may provide one or more tools to help accept handwritten user input and navigate through the assessment provided by the assessment application 1210. These tools may comprise, for example, an eraser tool 1250 and one or more navigation tools 1260.

The eraser tool 1250 may remove additional representations of the handwritten user input from the user device. For example, the user may activate the eraser tool 1250 by selecting the user interface at the tool's location. Once selected, the user may continue to interact with the user interface, but instead of providing handwritten user input 1240, the interactions may remove any handwritten user input 1240 that was displayed within a threshold area of the interaction. In some examples, the activation of the eraser tool 1250 may remove all handwritten user input 1240 within and around the guidelines 1230 or only a portion of the handwritten user input.

The one or more navigation tools 1260 may update the user interface to provide a next test item and/or store the digital representation of the handwritten user input 1240 to memory (e.g., local cache or the data store server 104). The handwritten user input 1240 may be transmitted via a communication network, in some examples, upon the interaction with the one or more navigation tools 1260. The next test item may be provided in a similar area as test item 1220. The digital representation of handwritten user input 1240 may be cleared from the guidelines 1230 in order to accept new handwritten user input from the user.

Figure 13:
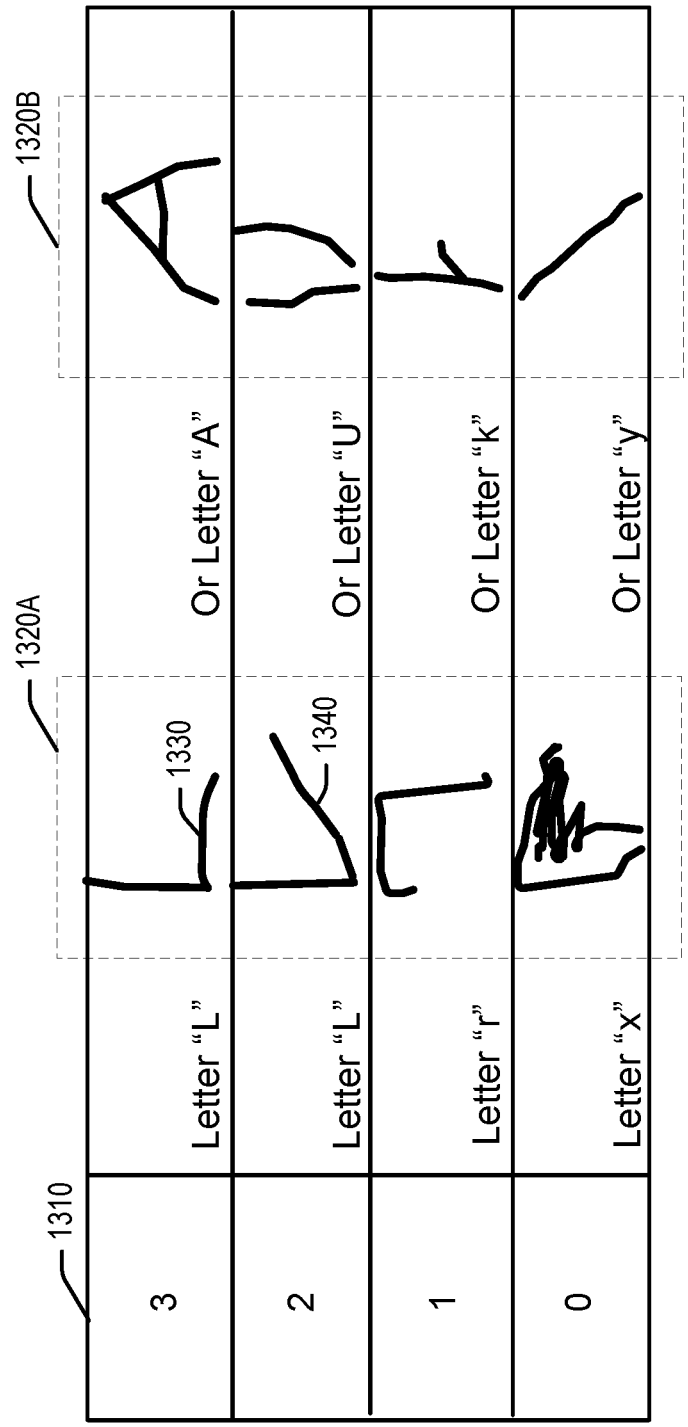
FIG. 13 is illustrative scoring method according to an embodiment of the disclosure.

With reference now to FIG. 13, illustrative model test responses and model response scores according to an embodiment of the disclosure are provided. In illustration 1300, a range of scores 1310 are associated with a plurality of responses 1320 (illustrated as 1320A and 1320B).

For model response scoring, the system may use a ground truth scoring method. For example, the system may receive a plurality of responses 1320 that are compared with an alphabet, letters, or other characters. The proximity of each of the model test responses may be scored on a scale (e.g., 0-3) with a comparison to all other responses in the plurality of responses 1320. In other examples, a human assessor or scoring processor 908

The range of scores 1310 may correspond with a relative scale that associates a correct model answer and the received model answer. For example, a first model response 1330 and a second model response 1340 may be received and analyzed by the system. The system may analyze the model answers individually or in a relative comparison to each other.

For example, when letters of the model test response are analyzed individually, the received model response may be compared with a set of rules and the number of rules that are satisfied may correspond with a higher score. In the example of the "L," the rules corresponding with the letter "L" may include three rules, one vertical line, one horizontal line, and a requirement that each line meet at the lower left corner of the response. The analysis may compare the model response with these rules. For example, the first model response 1330 may comprise two lines, one vertical and one horizontal, that meet at the end of each line. The analysis of this first model response 1330 may confirm that all rules are met and associate the first model response 1330 with the highest score based on the set of rules for the letter.

A similar analysis may be conducted for the second model response 1340. For example, the second model response 1340 may comprise one vertical line, one diagonal line, and the two lines meeting at the end of each line in the lower left corner of the response. Since only a subset of the rules is satisfied with this model answer, the analysis may associate a lower score corresponding with this model response along the range of scores 1310. The lower score may correspond with the number of rules that are satisfied by the received response, including when one of the lines is not horizontal or vertical or the lines do not meet at a point in the lower left corner.

The analysis may also determine a score by comparing the two responses and determining a score based on a relative degree of similarity between the correct response and the received responses. For example, when comparing the two responses with the correct response, the system may compare individual lines of the handwritten user input with the expected lines of a typed letter. The response that is closer to the correct response may receive a relatively higher score than the other.

Figure 15:
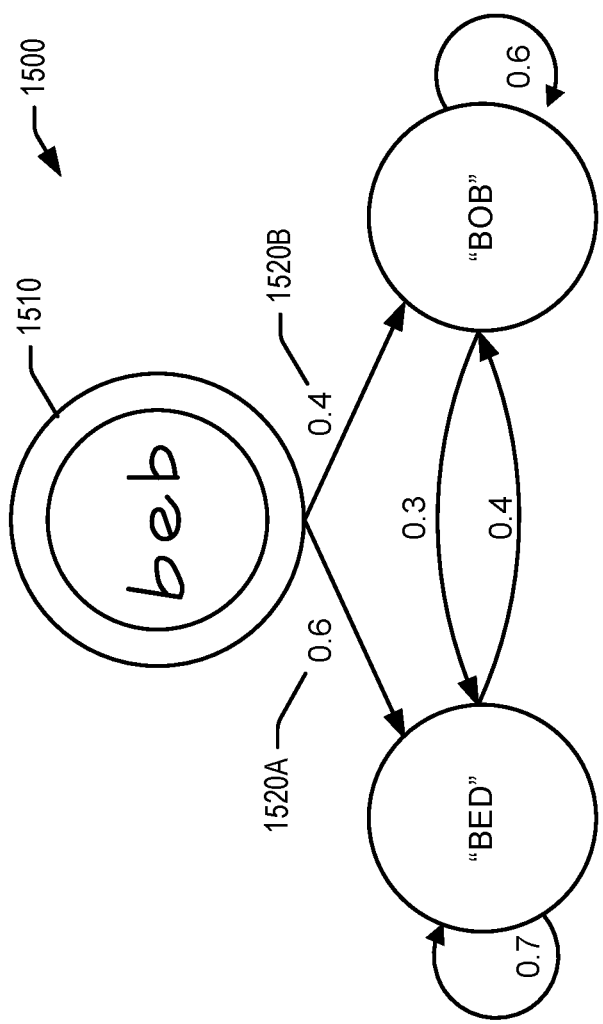
FIG. 15 is an illustrative example of a derivative coordinate modeling process according to an embodiment of the disclosure.
Figure 16:
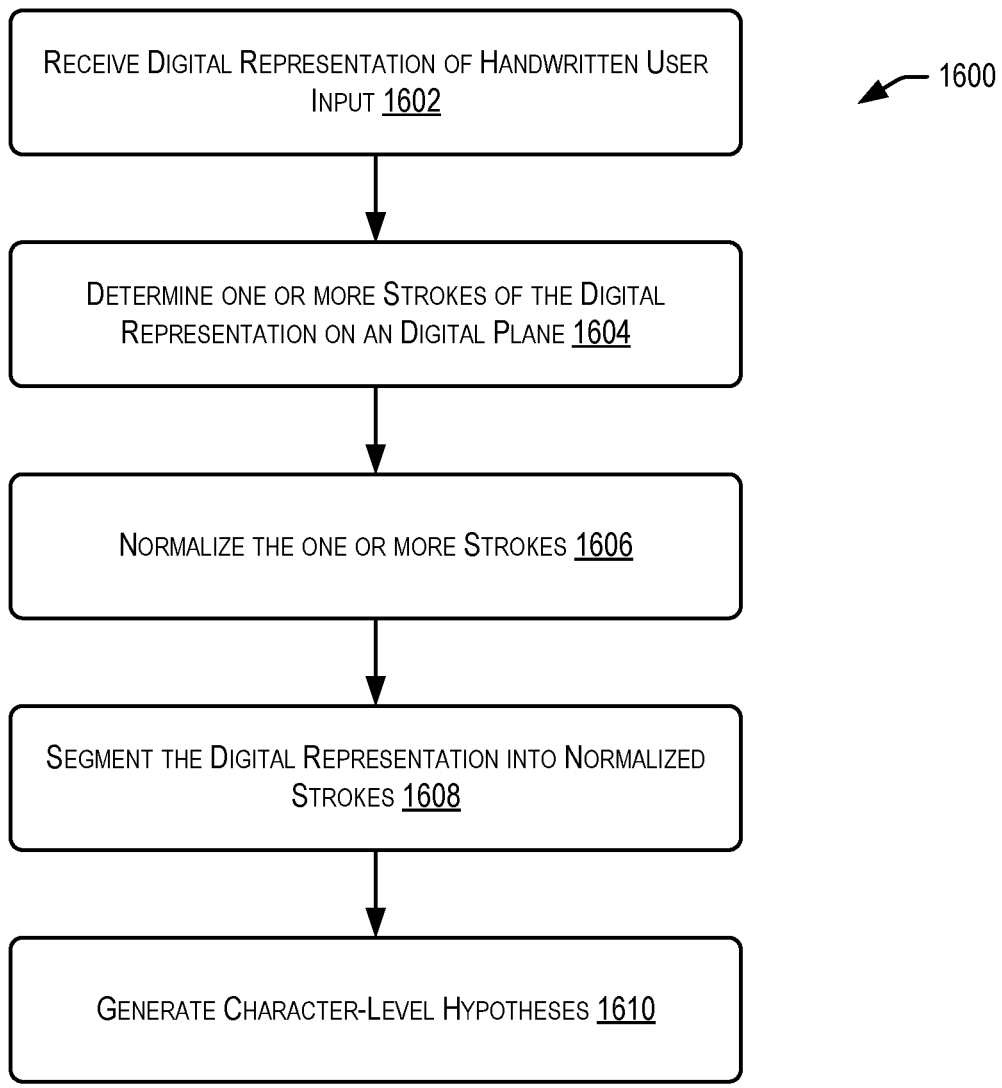
FIG. 16 is a flow diagram illustrating a process of performing a convolution neural network modeling process according to an embodiment of the disclosure.

A similar analysis may be conducted for a plurality of responses 1320. In some examples, the system may also score the model test response using an automated handwriting assessment method, as illustrated in FIGS. 14-16.

Figure 14:
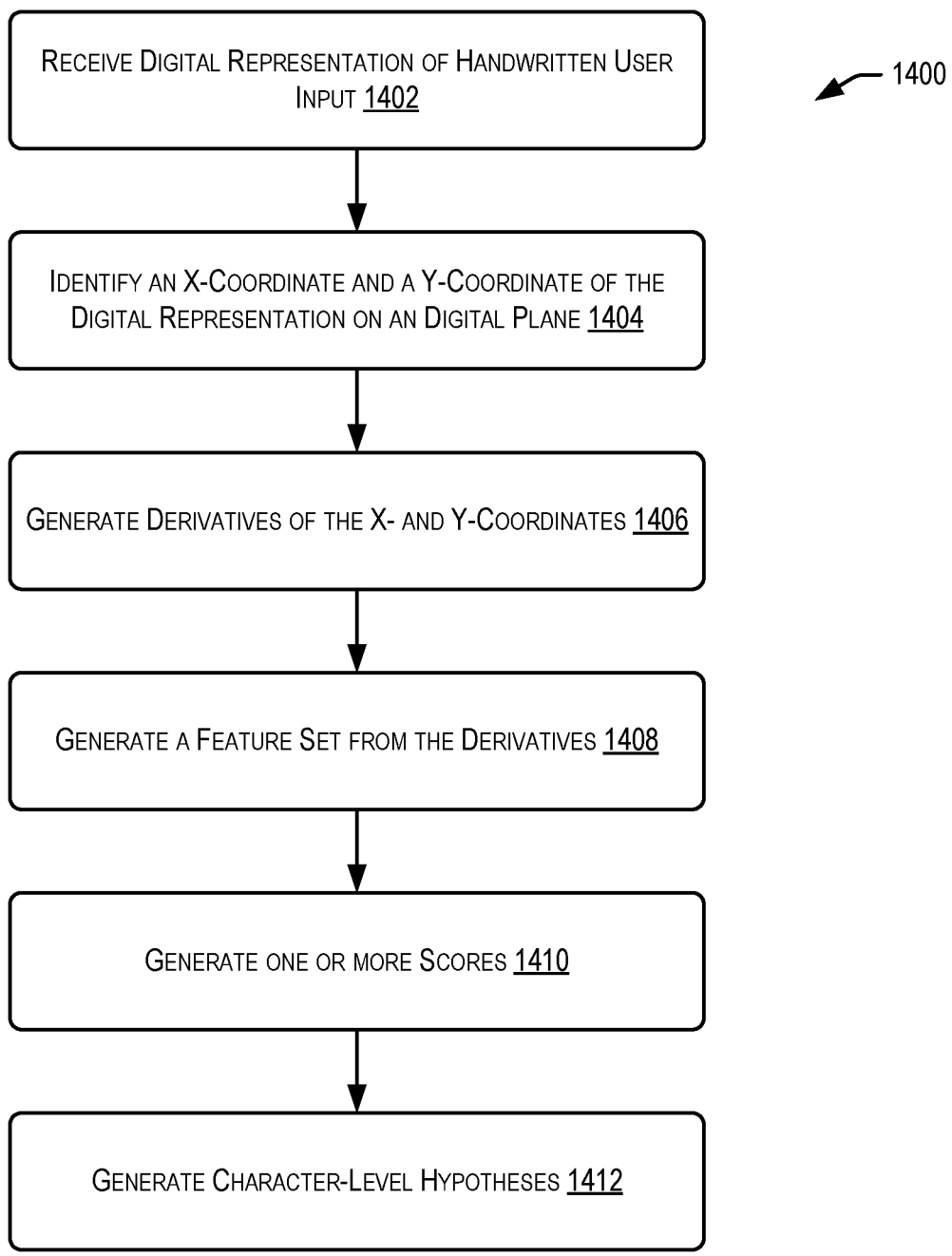
FIG. 14 is a flow diagram illustrating a process of performing a derivative coordinate modeling process according to an embodiment of the disclosure.

With reference now to FIG. 14, a flow diagram illustrating a process of performing a derivative coordinate modeling process according to an embodiment of the disclosure is provided. In illustration 1400, a process may be implemented in various distributed or consolidated systems described herein, including a content distribution network 100, the content management server 102, user devices 106, or supervisor devices 110.

At 1402, digital representation of handwritten user input may be received. For example, a content management server 102 may receive a digital representation of handwritten user input from a user device 106. The digital representation may comprise a first pixel and a second pixel. In some examples, the first pixel and/or the second pixel may correspond with a user interaction at the user device in response to receiving a test item presented at the user device.

At 1404, X-coordinate and a Y-coordinate of the digital representation of the handwritten user input may be identified on an electronic plane. For example, the content management server 102 may identify a starting X-coordinate and a Y-coordinate of a first portion of the handwritten user input and an ending X-coordinate and Y-coordinate of the same first portion of the handwritten user input. This may correspond with a line or dot of the digital representation that is plotted to the electronic plane to identify where on the electronic plane of the user interface that received the interaction from the user.

In another example, the content management server 102 may identify a single X-coordinate and Y-coordinate corresponding with a portion of the digital representation of the handwritten user input. This may also identify where on the electronic plane of the user interface that received the interaction from the user.

In some examples, the X-coordinate and Y-coordinate may be identified within a predetermined timeframe. The timeframe may be determined based at least in part on a time that a plurality of user devices provided digital representations for other test items. For example, the plurality of user devices may, on average, respond to a test item within one minute. The predetermined timeframe may correspond similarly with the previous responses or may be adjusted dynamically based on historical response by the user device.

The window size may be adapted. For example, the window size may be adapted in addition to or as an alternative to the timeframe.

At 1406, derivatives of the X-coordinate and Y-coordinate may be generated. For example, the content management server 102 may identify one or more numerical values associated with the X-coordinate and Y-coordinate. The content management server may generate a derivative of the numerical values for the portion of the digital representation of the handwritten user input. In some examples, the derivatives of the X-coordinate and Y-coordinate may comprise first derivatives and second derivatives, where the determination of the derivatives is generated more than once.

At 1408, a feature set may be generated from the derivatives. For example, the content management server 102 may generate the feature set from the derivatives. The feature set may comprise determining the difference between a first level of the feature and a second level of feature. In some examples, the feature set may comprise a four-dimensional feature set.

The observation window width may be limited to three, but other embodiments may implement a different observation window. For each of the letters, the content management server 102 may process the training data set with one or more states (e.g., thirteen), where each state's observation score comprises mixture components (e.g., sixteen). A separate or second model may be generated for analyzing the leading and trailing blanks for each test item or test response.

At 1410, one or more scores may be generated. For example, the content management server 102 may generate one or more scores based at least in part on the feature set associated with the derivatives of the X-coordinate and Y-coordinate. The one or more scores may comprise each state's observation score, a ground truth model score, or a test response in association with the handwritten user input. The observation may correspond with a calculated value to identify a discrete or continuous result from the model.

The observation score may correspond with an observation window in each pipeline or layer of the model (including a derivative coordinate modeling process or a convolution neural network modeling process). For example, the content management server 102 may receive and analyze the data from the observation window to determine the observation score corresponding with the data in that observation window. The observation score may include a value (e.g., zero to four, etc.) or letter (e.g., A to Z, etc.) based on the determination of the observation score with the observation window.

As an illustrative example, the upper right hand corner of the digital representation or derivative may include a sloped line. The observation score for this observation window associated with the letter "O" may be higher than the observation score for this observation window for the letter "Z," because of the characteristics of the letter that correspond with the digital representation or derivative of the digital representation received.

In some examples, a plurality of observation scores may be determined for each parsed letter or word. The potential letters or words that are not likely to correspond with the digital representation may be removed as further observation scores and observation windows are determined. The observation scores and models for each observation windows may be combined to determine a final response score for the model process to determine the letter or word.

In some examples, the generated one or more scores may correspond with a machine learning model that is trained to determine a character level hypothesis.

For 1412, a character level hypothesis may be generated. For example, the content management server 102 may determine a likely character based on the one or more generated scores. Word level recognition results may be generated from character level hypotheses constrained by the vocabulary range and word spellings (e.g., from a word dictionary). As a sample illustration, the letter "A" may correspond with 90% likelihood and a letter "W" may correspond with 80% likelihood. The character level hypothesis may determine that it is more likely that the letter "A" corresponds with the digital representation of the handwritten user input than the letter "W," because 90% is greater than 80%.

As a sample illustration, for each word sample, the first and second derivatives of the X and Y coordinates are extracted, generating a 4-dimensional feature set. The optimal observation window width is determined (e.g., 3). For each of the characters, the process may be trained with 13 states, with each state's observation score provided by a process of 16 mixture components. A separate process may remove the leading and trailing blanks for each test item. Word level recognition results may be generated from character level hypotheses constrained by the vocabulary range and word spellings identified from a dictionary.

With reference now to FIG. 15, an illustrative example of a derivative coordinate modeling process according to an embodiment of the disclosure is provided. In illustration 1500, the content management server 102 may receive a digital representation of handwritten user input 1510. The content management server 102 may determine the X-coordinate and Y-coordinate and generate a feature set from the derivatives of these values. One or more scores may be generated for individual characters or words overall, in order to generate a word prediction based on character level hypothesis and/or the scores. The greater score associated with the word prediction may be identified as the received test response from the user device. Once the word is predicted as the test response, the word may be submitted for scoring purposes.

The values 1520 (illustrated as 1520A and 1520B) of illustration 1500 correspond with the conditional probability distribution of the potential words corresponding with the received input. For example, value 1520A may correspond with a "0.6" likelihood that the corresponding word "B-E-D" is the intended response, whereas value 1520B may correspond with a "0.4" likelihood that the corresponding word "B-O-B" is the intended response. The conditional probability distribution may be used in a score calculation to determine if the spelling of the word is correct with respect to the test item presented to the user, despite the uncertainty of the determination of individual letters of the response.

Multiple levels may be determined as the feature set. For example, at a first level, a change in positions of dots corresponding with the X-axis and the Y-axis may be calculated and the difference between the dots may be determined. The movement between the dots on the x-axis and y-axis may correspond with the timeframe. This change in unit time may be a first level or first direction of the response.

The second level of the feature set may correspond with the change of velocity or acceleration. For example, the trajectory of the response may be sharp or slow to correlate with the change in speed of the response. As a sample illustration, the user may provide a relatively slow interaction in response to the first test item and speed up the interaction in response to the same first test item. The speed of the interaction may be tracked between a start of an interaction and an end of the same interaction. The speed of the interaction may be tracked at different points of time, such that the speed at a first time unit may be determined in the speed at a second time unit may be determined. The delta or change between the two time units may be identified as the acceleration.

The acceleration of the response may correspond with the second dimension feature set. These two features, the change in positions of dots corresponding with the X-axis and the Y-axis and the acceleration, may correspond with two levels as a feature of this model.

As a sample illustration, a first letter may correspond with a first line at coordinate location (0,0) along an X/Y axis and move to coordinate location (0,1) along the X/Y axis. The first letter may correspond with a second line at coordinate location (0,0) and move to coordinate location (1,0) along the X/Y axis. These two lines may be analyzed separately as part of the same letter. For example, the second coordinate may be subtracted from the first coordinate at the first level to determine the difference between the dots of the lines. Each of the lines may also correspond with a change in speed or acceleration which may correspond with the second level of the feature. Additional dimensions may be implemented as well.

The analysis may generate a conditional probability distribution corresponding with the likely letters and/or words associated with the response. Given the parameters of the model, the probability of a particular output sequence may be determined. For example, the likelihood of a first response "B-E-D" may be determined and the likelihood of the second response "B-O-B" may be determined.

With reference now to FIG. 16, a flow diagram illustrating a process of performing a convolution neural network modeling process according to an embodiment of the disclosure is provided. In illustration 1600, a process may be implemented in various distributed or consolidated systems described herein, including a content distribution network 100, the content management server 102, user devices 106, or supervisor devices 110.

At 1602, a digital representation of handwritten user input may be received. For example, the content management server 102 may receive the digital representation of handwritten user input from a user device in response to an interaction between a user and the interface of the user device.

At 1604, one or more strokes of the digital representation may be determined on a digital plane. The one or more strokes may be stored at a data store associated with the content management server 102. A stroke, for example, may comprise a single movement with a finger or a tool between the user and the user device via the user interface. A plurality of strokes may be combined to generate the digital representation of the handwritten user input. In between the strokes may exist blank spaces or the strokes may overlap to form the appearance of a single line.

A stroke may be separated when the tool or user device conducts an instantaneous change in direction. For example, a capital letter "B" may comprise a first vertical stroke and a second stroke that resembles the number three. The user may direct the tool from a top portion of a user interface to a bottom portion of the user interface to generate the first stroke in a single movement. The user may then direct the tool from the bottom portion of the user interface upward to form the second stroke of the "B." Between the two strokes, the tool may change the direction from operating substantially vertically to operating substantially horizontally. In this example, the content management server 102 may determine that two strokes are generated, with or without the tool being removed from the user interface (e.g., a single interaction).

The content management server 102 may parse strokes and determine segments of the strokes from the parsed data. For example, the stroke may comprise an instantaneous change in direction. The content management server 102 may identify the instantaneous change in direction by analyzing the interaction data and parsing the stroke into a plurality of strokes at each point that the change in direction is received. As a sample illustration, with capital letter "B," the interaction between the tool and the user interface may generate three parsed strokes, including a first stroke for the first vertical line, a second stroke for the lower circular portion of the letter, and a third stroke for the upper circular portion of the letter.

In some examples, the length of the identified stroke may be determined. The length my correspond with the digital representation of when the tool starts the interaction with the user interface until when the tool ends the interaction with the user interface. For example, the length of a dot may be relatively shorter than the length of a line. In some examples, strokes may be removed from the digital representation of handwritten user input when the length of the stroke is less than a threshold length. The content management server 102 may generate analysis on the strokes, including normalization or a determination of a character, letter, or word, that removes the strokes that correspond with a length less than the threshold length.

The interactions between the tool and the user interface may be stored with the data store. The interactions may be stored as sequential interaction data (e.g., comprising time, direction, duration, etc.). The interactions may comprise, for example, velocity and/or direction data generated by the tool when interacting with the user interface. In some examples, the interaction data may comprise acceleration data as well (e.g., increasing the velocity of the tool movement as the handwritten user input is formed).

At 1606, one or more strokes of the digital representation may be corrected or normalized. For example, the content management server 102 may normalize the handwritten user input by removing very short strokes, dots, and/or correcting the strokes by estimating slants of all strokes (e.g., by linear regression).

In some examples, a stroke may be rotated as part of the normalization process. As a sample illustration, the stroke may comprise a substantially vertical line with a slope of 0.2 (e.g., leaning slightly to the right). The normalization process may estimate that the slope of the line should be zero or 0.5 along the y-axis. These slope values may be predetermined by the content management server 102 and any slope that does not correspond with these two values may be estimated and normalized to equal one of these two values.

In some examples, a stroke may be moved as part of the normalization process. As a sample illustration, the stroke may be provided by the tool at a location of the user interface that is outside of the guidelines (e.g., illustrated in FIG. 12). The normalization process may move the location of the stroke to be placed within the guidelines. In some examples, a plurality of strokes may be moved to an area associated with the guidelines and maintain a proximate distance between each other.

The normalization may begin with a top left point of the digital representation of the handwritten user input and segment the individual strokes or characters as connected components. Each letter (comprising one or more strokes) may be normalized to the same size and padded with small blank space.

In some examples, the normalization process may correspond with generating a normalization layer and/or converting the identified strokes into a standard image (e.g., JPEG, etc.). For example, a stroke a correspond with a value that is to be normalized by subtracting a mean value and dividing by the standard deviation for an input channel. Then, the layer may shift the input by an offset by a predetermined scale factor. Multiple input channels may be analyzed. This normalization layer may reduce the sensitivity to network initialization and bring the values to a common scale.

In some examples, the normalization process may calculate a derivative of a value corresponding with a stroke and further determine the normalized value from the derivative. For example, the content management server 102 may smooth a line corresponding with the stroke based at least in part on the derivative. The stroke may correspond with a substantially straight or curved line after the normalization process completes.

In some examples, the normalization process may correspond with a window or rectangle in a corner of the digital representation of the handwritten user input (e.g., upper corner, etc.). The window or rectangle may comprise a range of pixels that is smaller than the digital representation as a whole. The process may move this small window horizontally or vertically to perform the convolution and output a convolution layer. The convolution layer may correspond with a blurred representation of a small size picture (e.g., to generate a digital representation corresponding with less information, or to present more data in less space, etc.).

In some examples, the process of analyzing the digital representation of handwritten user input may comprise training a convolution neural network that is fed into a convolution layer with a plurality of kernel images. The convolution layer may be used to generate one or more pooling layers with smaller kernel sizes than the convolution layer. The output of a pooling layer may be used with a connected layer and classified.

At 1608, the digital representation may be segmented into normalized strokes. For example, individual letters may be normalized by moving at least a portion of the letter with respect to other letters in a word. This may comprise adjusting one stroke to be positioned closer to another stroke or a plurality of strokes to a different location. For example, the letter "Y" of "BABY" may originally be placed by the user along a lower gridline. The letter may be normalized to an upper position of the gridline with respect to the other letters in the word to place the letter along a same height as other letters in the word. This may provide a response with a balanced layout (e.g., resulting with a higher score).

At 1610, a character level hypothesis may be generated. For example, once the digital representation has been normalized and generated one or more strokes corresponding with one or more individual letters, the content management server 102 may generate a character level hypothesis constrained by the vocabulary range and word spelling of a dictionary.

In some examples, a combination of character level hypothesis for multiple letters may be combined to generate a word hypothesis. For example a first letter estimation may be changed when the letter is likely to correspond with a different letter according to the dictionary. The content management server 102 may filter all words so that the number of segmented characters is the same as the number of characters of digital representation of handwritten user input.

As a sample illustration, the process may comprise two components: a character segmenter that segments individual characters out of a whole word and a convolution neural network trained with segmented characters. The process may first implement a heuristic segmentation method by storing all strokes of the word, removing very short strokes, and correcting the remaining strokes by estimating slants of all strokes by linear regression. The strokes may be normalized with respect to the top left point of the word. The characters may be segmented as connected components. In some examples, each letter may be normalized to the same size and padded with small blank space. After the segmentation, the process may filter all words so that the number of segmented characters is the same as the number of characters of the corresponding correct word.

The process may normalize each character to 32×32 gray image and train a convolution neural network. The structure of the networks may comprise 32×32 gray images that are provided to a convolution layer with 20 filter kernels of size 5×5, followed by a max-pooling layer with kernel size of 2×2, followed by a second convolution layer with 50 filter kernels of size 5×5, followed by second max-pooling layer with kernel size of 2×2, and the output finally provided to a fully connected layer with 500 neurons. The classifier is softmax, which outputs N dimensional class level probability, where N is class space.

Figure 17:
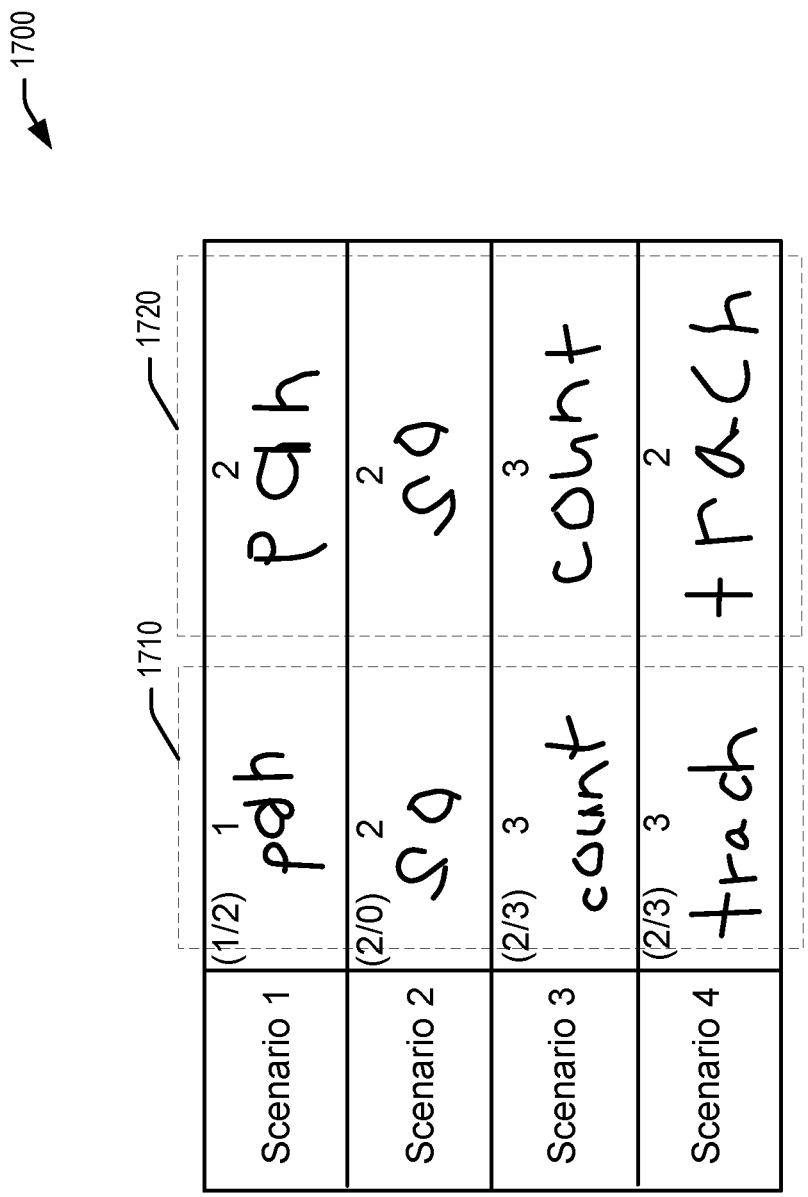
FIG. 17 is an illustrative example of scoring the modeling processes according to an embodiment of the disclosure.

With reference now to FIG. 17, an illustrative example of scoring the modeling processes according to an embodiment of the disclosure is provided. In illustration 1700, a process may be implemented in various distributed or consolidated systems described herein, including a content distribution network 100, the content management server 102, user devices 106, or supervisor devices 110. The illustration 1700 may comprise digital representations of handwritten user input 1710 and processed digital representations 1720.

In some examples, the process may automatically score the digital representation of handwritten user input with a rating scale (e.g., 0-3). Given a probability matrix of a word, the process may extract the probability with respect to the labeled letters and calculate maximum, minimum, mean, and variance to form a feature set. The feature set may be used to train regression models to predict the scores.

To predict word quality on the rating scale, the process may train one or more regression models (e.g., linear regression, ridge regression, and kNN) over four-dimensional features to characterize the probability distribution over the whole word. When multiple regression models are used, the regression models may be weighted to combine these two methods into a final score. When a single regression model is used, the final score may be determined from the automatic handwritten analysis method without a further ranking.

Figure 18:
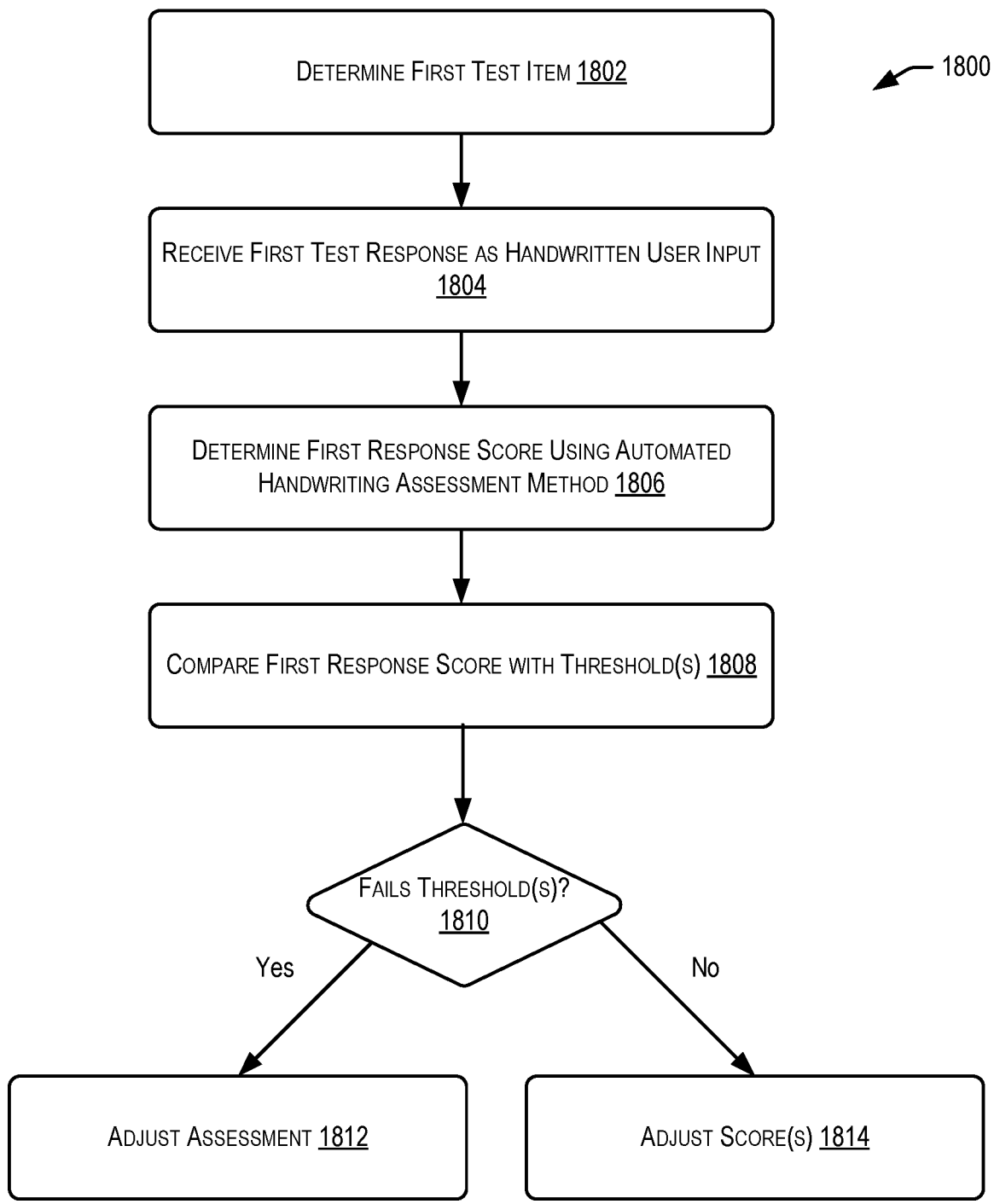
FIG. 18 is a flow diagram illustrating a process of providing an assessment to user according to an embodiment of the disclosure.

With reference now to FIG. 18, a flow diagram illustrating a process of providing an assessment to user according to an embodiment of the disclosure is provided. In illustration 1800, a process may be implemented in various distributed or consolidated systems described herein, including a content distribution network 100, the content management server 102, user devices 106, or supervisor devices 110.

At 1802, a first test item may be determined. For example, the content management server 102 may determine a first test item by accessing a data store and retrieving the first test item from the data store to transmit to user device 106. In some examples, the first test item is associated with a plurality of letters to spell a word associated with the first test item. The first test item may be transmitted and provided to a user interface of a user device. In some examples, the user device may prompt a first response input to the first test item (e.g., by providing guidelines or starting a timer, etc.).

At 1804, a first response input may be received as handwritten user input. For example, the content management server 102 may be received a digital representation of handwritten user input from a user device via a communication network. The first response input may comprise a digital representation of a first handwritten user input associated with the first test item.

The first response input may be analyzed using an automated handwriting assessment method. Any automated handwriting assessment methods are available including those discussed throughout the disclosure.

At 1806, a first response score may be determined using an automated handwriting assessment method. For example, the content management server 102 may determine a first response score based on the analysis of the first response input.

At 1808, the first response score may be compared with a threshold. For example, the content management server 102 may compare the first response score determined from the automated handwriting assessment method with a spelling accuracy threshold value and/or a letter accuracy threshold value.

At 1810, an analysis of a failure of either threshold is determined. For example, when the first response score fails to exceed the spelling accuracy threshold value, the content management server 102 may adjust an outcome score based at least in part on comparison at 1812. When the first response score fails to exceed the letter accuracy threshold value, the content management server 102 may determine a second test item that comprises at least one common letter of the plurality of letters with the first test item at 1812. When the first response score exceeds the spelling accuracy threshold value and/or the letter accuracy threshold value, an outcome score may be adjusted at 1814.

More than one test item may be transmitted from the user device to the content management server 102. For example, the content management server 102 may transmit the second test item to the user interface of the user device and receive a second response input. The second response input may comprise a second digital representation of a second handwritten user input. The content management server 102 may analyze the second response input using one or more automated handwriting assessment methods discussed herein and determine a second response score based on the analysis of the second response input. The outcome score may be again adjusted based at least in part on the second response score.

In some examples, model test items may be provided as well. For example, the content management server 102 may receive a training data set comprising a model test item and a plurality of model test responses. The content management server 102 may receive a corresponding score for each of the plurality of model test responses and store the corresponding score with the plurality of model test responses in a training set data store. The correlation between the model test items and the scores may be used to determine future scores associated with test items and test item responses from the user device.

Figure 19:
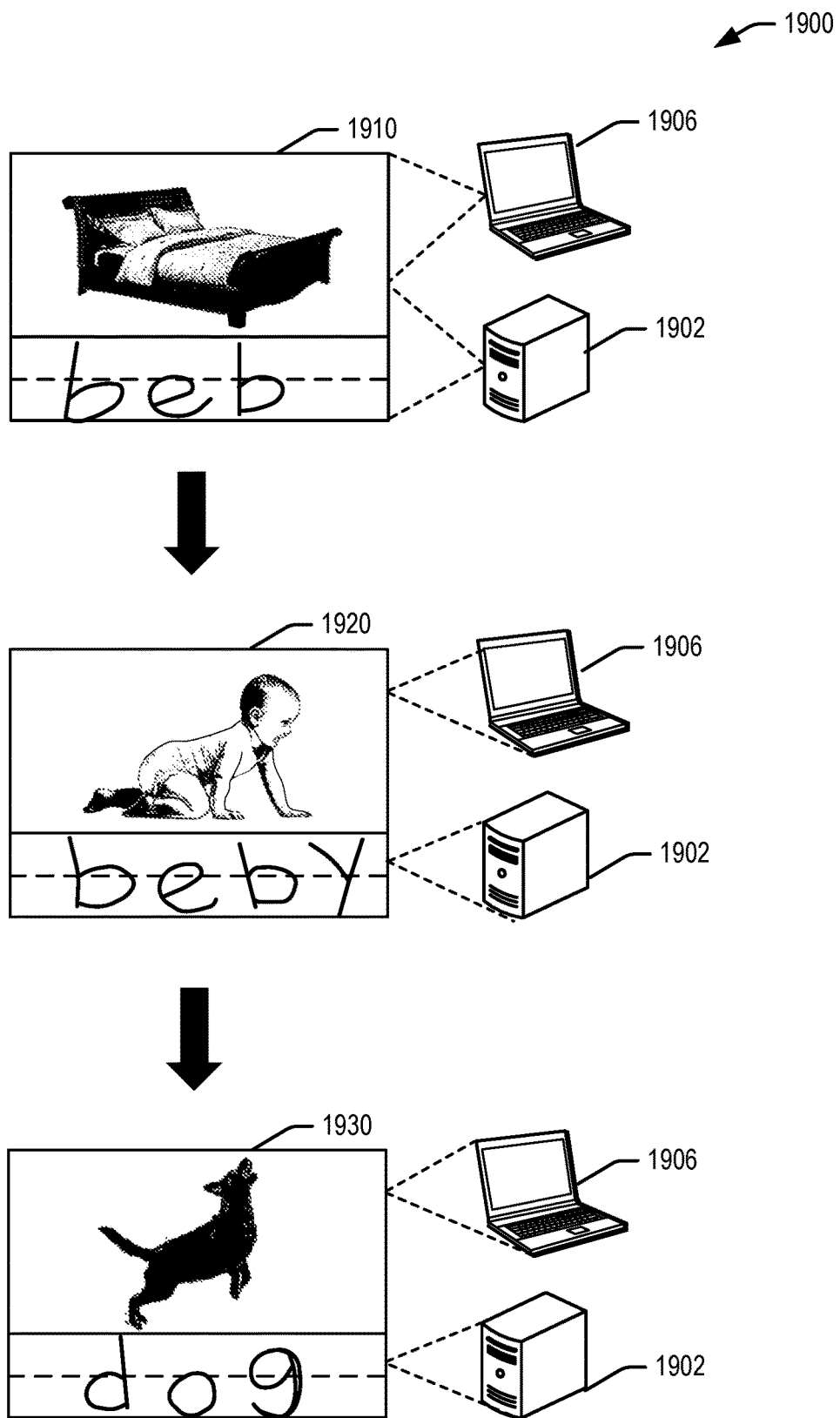
FIG. 19 is an illustrative example of dynamically adjusting an assessment according to an embodiment of the disclosure.

With reference now to FIG. 19, an illustrative example of dynamically adjusting an assessment according to an embodiment of the disclosure is provided. In illustration 1900, a plurality of test items may be provided by the content management server 1902 to a user device 1906 during an assessment. The content management server 1902 may be similar to the content management server 102 and the user device 1906 may be similar to the user devices 106 or supervisor devices 110. The process in illustration 1900 may be implemented in various distributed or consolidated systems described herein.

At 1910, a first test item is provided to the assessment application at the user device 1906. The content management server 1902 may analyze characters and letters in the response provided to the assessment application. The content management server 1902 may also analyze the spelling of the response. In this analysis, the content management server 1902 may determine that "D" is backwards in association with the test item identifying a bed, where the intended response would have included "BED."

A second test item may be identified based on this analysis. For example, the second test item may attempt to determine whether the user understands how to spell the word that is similar to "BED" and may also attempt to determine whether the user understands how to write the letter "D." the content management server 1902 may determine the 2nd test item and real time in response to the first response and provide multiple test items to test multiple aspects of spelling, letter writing, and word determination.

At 1920, a second test item is provided to the assessment application at the user device 1906. The second test item may correspond with an intended response that includes at least one letter from the first test item. In this illustration, the word "BABY" is an intended response, which can help the content management server 1902 further analyze the user spelling of similar words (e.g., "BED" and "BABY").

The first response and the second response may both correspond with misspellings. The pattern of misspellings by the user may be correlated with poor spellings of complete words, rather than unknown letters or character recognition within the words. An overall score may be adjusted (e.g., decreased) based at least in part on the determination of the misspellings and the analysis in association with the first response and the second response.

At 1930, a third test item may be identified and provided to the assessment application at the user device 1906. In this example, the third test item may include a letter that was improperly provided in the first response to provide a second test for the particular letter (e.g., the third test item). For example, the content management server 1902 may identify the word "DOG." This word would include the letter "D" which was not provided correctly in response to the first test item, even though it was expected in the response. The third response may provide accurate letters and spelling of the word. The content management server 1902 may adjust the score upon determining that the correct letters and accurate spelling is provided in response to the third test item.

In some examples, a different user may receive a different test. For example, the first user may provide an incorrect "D" in response to the first test item and a second user may provide a correct "D" in response to the first test item. The content management server 1902 may determine the second or subsequent test items based at least in part on the user's responses to previous test items. In some examples, the test items may not change and a standard set of test items may be provided to all users of the system by the content management server 1902 via the assessment applications.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method for automated handwriting assessment comprising:
generating a digital representation of a handwritten user input;
identifying strokes in the digital representation of the handwritten user input;
storing the identified strokes;
executing a heuristic segmentation method to correct a slant of at least some of the identified strokes using linear regression;
executing a convolution neural network model to normalize the at least some of the identified strokes by performing a convolution by translating a window comprising a subset of pixels in the digital representation of the handwritten user input amongst a plurality of pixels in the digital representation;
segmenting the digital representation of the handwritten user input into normalized digital strokes;
determining a number of characters in a correct response word;
determining at least one character associated with the normalized digital strokes, wherein the at least one character includes a number of characters equal to the number of characters in the correct response word; and
generating a word hypothesis by applying a model to the at least one character.

2. The computer-implemented method of claim 1, further comprising:
identifying a length of the identified strokes; and
generating an analysis set from the identified strokes, wherein the analysis set excludes strokes having a length below a threshold value, wherein the at least some of the identified strokes comprise the strokes in the analysis set.

3. The computer-implemented method of claim 1, wherein correcting the at least some of the identified strokes comprises estimating the slant of the at least some of the identified strokes.

4. The computer-implemented method of claim 1, wherein the at least some of the identified strokes are normalized with respect to a top left point of a part of the digital representation of the handwritten user input.

5. The computer-implemented method of claim 4, wherein the part of the digital representation of the handwritten user input comprises a word.

6. The computer-implemented method of claim 1, wherein the normalizing the at least some of the identified strokes comprises matching a size of the identified strokes to a predefined symbol and padding the identified strokes with a blank space.

7. The computer-implemented method of claim 1, wherein normalizing the at least some of the identified strokes comprises converting the identified strokes into a standard image.

8. The computer-implemented method of claim 7, wherein the standard image comprises a 32×32 gray image.

9. A computer device including a content management system for improving distribution and conversion of academic data, the content management system comprising:
one or more processors; and
one or more memories coupled with the one or more processors, wherein the one or more processors and the one or more memories are configured to:
generate a digital representation of a handwritten user input;
identify strokes in the digital representation of the handwritten user input;
store the identified strokes;
execute a heuristic segmentation method to correct a slant of at least some of the identified strokes using linear regression;

execute a convolution neural network model to normalize the at least some of the identified strokes by performing a convolution by translating a window comprising a subset of pixels in the digital representation of the handwritten user input amongst a plurality of pixels in the digital representation;

segment the digital representation of the handwritten user input into normalized digital strokes;

determine a number of characters in a correct response word;

determine at least one character associated with the normalized digital strokes, wherein the at least one character includes a number of characters equal to the number of characters in the correct response word; and generate a word hypothesis by applying a model to the at least one character.

10. The computer device of claim 9, wherein the one or more memories are further configured to:

identify a length of the identified strokes; and generate an analysis set from the identified strokes, wherein the analysis set excludes strokes having a length below a threshold value, wherein the at least some of the identified strokes comprise the strokes in the analysis set.

11. The computer device of claim 9, wherein correcting the at least some of the identified strokes comprises estimating a slant of the at least some of the identified strokes.

12. One or more non-transitory computer-readable storage media device collectively storing computer-executable instructions that, when executed by one or more computer systems, configure the one or more computer systems to collectively perform operations comprising:

generating a digital representation of a handwritten user input;

identifying strokes in the digital representation of the handwritten user input;

storing the identified strokes;

executing a heuristic segmentation method to correct a slant of at least some of the identified strokes using linear regression;

executing a convolution neural network model to normalize the at least some of the identified strokes by performing a convolution by translating a window comprising a subset of pixels in the digital representation of the handwritten user input amongst a plurality of pixels in the digital representation;

segmenting the digital representation of the handwritten user input into normalized digital strokes;

determining a number of characters in a correct response word;

determining at least one character associated with the normalized digital strokes, wherein the at least one character includes a number of characters equal to the number of characters in the correct response word; and generating a word hypothesis by applying a model to the at least one character.

13. The one or more non-transitory computer-readable storage media device of claim 12, wherein the operations further comprise:

identifying a length of the identified strokes; and generating an analysis set from the identified strokes, wherein the analysis set excludes strokes having a length below a threshold value, wherein the at least some of the identified strokes comprise the strokes in the analysis set.

14. The one or more non-transitory computer-readable storage media device of claim 12, wherein correcting the at least some of the identified strokes comprises estimating a slant of the at least some of the identified strokes.

15. The one or more non-transitory computer-readable storage media device of claim 12, wherein the at least some of the identified strokes are normalized with respect to a top left point of a part of the digital representation of the handwritten user input.

* * * * *